(12) United States Patent
Yonezawa

(10) Patent No.: US 7,239,997 B2
(45) Date of Patent: Jul. 3, 2007

(54) APPARATUS FOR STATISTICAL LSI DELAY SIMULATION

(75) Inventor: Hirokazu Yonezawa, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 536 days.

(21) Appl. No.: 10/756,471

(22) Filed: Jan. 14, 2004

(65) Prior Publication Data

US 2004/0167756 A1 Aug. 26, 2004

(30) Foreign Application Priority Data

Feb. 21, 2003 (JP) .............................. 2003-044029

(51) Int. Cl.
*G06F 17/50* (2006.01)

(52) U.S. Cl. ........................... 703/19; 703/13; 703/14; 703/15; 703/16; 716/1; 716/5; 716/6

(58) Field of Classification Search .................. 703/13, 703/14, 15, 19, 16, 17; 716/5, 6, 1
See application file for complete search history.

(56) References Cited

U.S. PATENT DOCUMENTS

| | | | |
|---|---|---|---|
| 5,383,167 A | | 1/1995 | Weil |
| 5,638,294 A | * | 6/1997 | Sasada ........................... 716/5 |
| 5,974,247 A | * | 10/1999 | Yonezawa ..................... 703/19 |
| 6,066,177 A | * | 5/2000 | Hatsuda ........................ 703/19 |
| 6,278,964 B1 | * | 8/2001 | Fang et al. .................... 703/19 |
| 6,389,381 B1 | * | 5/2002 | Isoda et al. ................... 703/19 |
| 6,526,541 B2 | * | 2/2003 | Sugibayashi .................... 716/1 |
| 6,604,066 B1 | * | 8/2003 | Hatsuda ........................ 703/19 |
| 6,629,299 B1 | * | 9/2003 | Iwanishi ......................... 716/6 |
| 6,701,497 B1 | * | 3/2004 | Ohkubo .......................... 716/6 |
| 6,718,529 B1 | * | 4/2004 | Iwanishi ......................... 716/6 |
| 7,010,475 B2 | * | 3/2006 | Ehrler .......................... 703/15 |
| 7,051,314 B2 | | 5/2006 | Goto |
| 2001/0034595 A1 | * | 10/2001 | Yamaguchi ................... 703/19 |
| 2002/0095646 A1 | * | 7/2002 | Ohkubo .......................... 716/6 |
| 2004/0215437 A1 | * | 10/2004 | Sul .............................. 703/19 |
| 2004/0254776 A1 | | 12/2004 | Andou |
| 2005/0276135 A1 | * | 12/2005 | Yonezawa ................... 365/203 |

OTHER PUBLICATIONS

Gate Sizing Using a Statistical Delay Model, Jacobs et al, DATE. 2000, ACM 2000.*
"Cadence Standard Parasitic Format (SPF).", Version C1.3, pp. 8-20, 1993 Cadence Design Systems Inc. Issued Sep. 16, 1993, Printed Sep. 16, 1993.
"Star-Hspice Manual.", vol. 1-Simulation And Analysis, Release 2000.2, May 2000, Avant!Corporation, Feb. 2000. pp. 2 (total).
"Standard Delay Format Specification Version 3.0.", Open Verilog International, May 1995, pp. 4 (total).

* cited by examiner

*Primary Examiner*—Fred Ferris
(74) *Attorney, Agent, or Firm*—McDermott Will & Emery LLP

(57) ABSTRACT

A statistical delay simulation apparatus includes: a circuit simulator for simulating a circuit operation of a circuit cell constituting an LSI; a statistical delay library generator for driving the circuit simulator and generating, based on a process parameter and the like, a statistical delay library in which the dependency of a delay variation on a predetermined operation condition in each circuit cell is described; a delay calculator for calculating a delay amount of each circuit cell to generate a statistical LSI delay information file containing data on the calculated delay amount; and a static timing analyzer for simulating, based on data of the statistical LSI delay information file, an operation with a delay variation of the LSI to generate a statistical LSI delay analysis result file.

19 Claims, 21 Drawing Sheets

FIG. 8

SDF FILE
```
(INTERCONNECT X15/O X16/I
    (0.002)(0.002))
       ⋮
(CELL    ⋮
    (CELLTYPE"INV")
    (INSTANCE X15)
    (DELAY(ABSOLUTE
    (IOPATH I O (0.362)(0.455)))))
```

ADDITIONAL FILE

| CIRCUIT CELL NAME | RISE SIDE STANDARD DEVIATION | FALL SIDE STANDARD DEVIATION |
|---|---|---|
| ⋮ | ⋮ | |
| X15 | 0.029 | 0.036 |
| ⋮ | | |

FIG. 19

| MARGIN COMPONENTS | best | typ | worst |
|---|---|---|---|
| P | 0.65 | 1 | 1.45 |
| V | 0.87 | 1 | 1.18 |
| T | 0.91 | 1 | 1.11 |

FIG. 23

PRIOR ART

| MARGIN COMPONENTS | best | typ | worst |
|---|---|---|---|
| P | 0.6 | 1 | 1.4 |
| V | 0.85 | 1 | 1.15 |
| T | 0.9 | 1 | 1.1 |

APPARATUS FOR STATISTICAL LSI DELAY SIMULATION

BACKGROUND OF THE INVENTION

The present invention relates to a statistical simulation apparatus and a simulation method for estimating a variation in delay of an LSI circuit due to variation causes occurring in LSI fabrication processes or the like and utilizing a result of the estimation in simulation of LSI circuit delay.

With development of fabrication technologies, rapid improvements of transistors have been made in terms of size reduction and integration density increase. Accordingly, as for CMIS semiconductor integrated circuit devices (hereinafter, referred to as "LSIs"), devices in which various functions are formed on one chip have been developed in recent years.

When an LSI is developed, a design margin is normally provided during fabrication process steps. There are various factors requiring consideration of a design margin. For example, a variation in electric properties of each transistor constituting a circuit may be caused in fabrication process steps or such a variation may also be caused due to change in an operation environment such as voltage or temperature. Thus, a design margin has to be considered at any time.

As shown in FIG. 22, in general, an LSI can be decomposed into signal paths 200 each including 1st through nth (where n is 1 or an integer larger than 1) stage circuit cells 202 between two flipflops 201.

Each of the circuit cells 202 includes logic circuits such as inverter, NAND and NOR. The logic circuits are connected to each other by an interconnect. In this case, it is required to design an LSI so that a delay caused when a signal is propagated through a series of the circuit cells 202 included in a signal path 200 can be fit within a predetermined period which is determined based on a cycle time of a clock signal 203 (normally, the reciprocal of an operation frequency or a clock frequency, or a period obtained by integrally multiplying the reciprocal). This relationship will be expressed as Equation 1.

$$t_{cycle} \geq \Sigma t_i + K \text{(where } i=1, 2, \ldots \text{ nth integer)} \qquad \text{[Equation 1]}$$

In this equation, $t_{cycle}$ indicates a cycle time which is a design target property to be achieved, $\Sigma t_i$ indicates the total sum of signal propagation delays $t_i$ between the input and output terminals of a circuit cell i located between flipslops 201, K indicates the sum of a set-up time of the flipflops 201, a skew of the clock signal 203 and the like.

A design margin is indicated by coefficients for various variation causes for delays which are called "derating factors". For example, as shown in the following Equation 2, there is a method in which a delay value under the worst condition is simply estimated from a standard (or typical) delay value to achieve a labor saving design. Herein, $t_{worst}$ indicates the worst value for each signal path delay, $t_{typ}$ indicates a standard value for each signal path delay, P indicates a delay variation coefficient for a delay due to a variation in fabrication process steps, V indicates a delay variation coefficient for a delay due to a power supply voltage range, and T indicates a delay variation coefficient for a delay due to a temperature range. In this case, a standard value for delays of all signal paths in an LSI is first obtained, and then the obtained value is multiplied by each of the derating factors P, V and T to simply obtain a worst value for a design margin. Herein, the right side of Equation 2 corresponds to $\Sigma t_i$ in Equation 1.

An example for the derating factors is shown in FIG. 23. Assume that P, V and T in Equation 2 are substituted by values shown in FIG. 23. A worst delay value $t_{worst}$ can be obtained from a standard (typ) delay value $t_{typ}$ based on Equation 3. Moreover, a best delay value $t_{best}$ can be obtained based on Equation 4 in the same manner. Thus, the operation of an LSI under each of the best and worst conditions can be confirmed at the time of designing.

$$t_{worst} = t_{typ} \times P \times V \times T \qquad \text{[Equation 2]}$$

$$t_{worst} = t_{typ} \times 1.4 \times 1.15 \times 1.1 \qquad \text{[Equation 3]}$$

$$t_{worst} = t_{typ} \times 0.6 \times 0.85 \times 0.9 \qquad \text{[Equation 4]}$$

In an LSI, quality and performance trade off each other. Therefore, it is safe to provide an excessive margin for an LSI, but if so, useless part in a design is increased, so that performance (e.g., operation frequency) is deteriorated.

On the other hand, if a margin is too small, lack of quality increases possibility of causing malfunction. Therefore, unless an appropriate margin, i.e., a not excessive and not too small margin, can be evaluated and an designing environment which allows designing based on the evaluation is provided, it is difficult to effectively develop an LSI, such as recent digital signal processors, which allows great performance and high quality at the same time.

Moreover, with a method in which a design margin is provided based on delay calculation performed by using fixed derating factors for all of the LSI's signal paths, such as the method shown in FIG. 23 using worst conditions, an optimum margin for each signal path can not be evaluated and also can not be set. Therefore, in many cases, an excessive margin as a whole is produced.

Then, a method for statistically calculating delays of an LSI without using derating factors has been known (see U.S. Pat. No. 5,383,167). This is a method in which a variation in delay of a circuit cell included in an LSI, i.e., a delay probability distribution is expressed by a histogram, a delay probability distribution for each circuit cell located along a signal path in the LSI is obtained by operation using obtained histograms, and then precision of a design is evaluated by the obtained variation (probability distribution) in output delay of the signal path. With this method, delay variations according to signal paths can be individually evaluated. Therefore, a design margin can be designed so as not to be excessive or too small, compared to a method in which derating factors are used.

However, in the known LSI delay statistical simulation method described in the above-described United States Patent Publication, a variation in delay of a circuit cell is expressed by a histogram. Therefore, it is possible to give an arbitrary probability distribution (shape) but it is also required to perform operations by carrying out multiple superposed integrations using a histogram in a range of each probability distribution in order to obtain a variation in delay of a signal path. Thus, a problem in which the operation becomes complex arises.

Moreover, another problem is that since a circuit cell has a fixed value for a delay variation and changes in the connection state and layout state of each circuit cell in the LSI are not taken into consideration, reliability of finally obtained operation results is low.

Moreover, in an initial stage of LSI development, there is the demand of understanding of ranges of upper and lower limits for a delay variation even roughly. However, in the known method described above, the ranges of upper and lower limits for a delay variation can not be understood in a simple manner.

Moreover, in the known method, as shown in FIG. 23, a delay variation is assumed to have a symmetrical distribution about the typ value, i.e., variation amounts on either side of the best side and the worst side are the same. In fact, there are cases where the distribution of a delay variation is asymmetrical about the typ value. In such cases, variation amounts on the best side and the worst side are different from each other. This asymmetrical phenomenon can be dealt with by only the above-described complex calculation using a histogram, but it can not be dealt with in a simple manner by using other calculations.

SUMMARY OF THE INVENTION

In view of the above-described problems, it is an object of the present invention to make it possible to estimate, in a designing stage, a delay variation in an LSI and then to reliably utilize a result of the estimation in LSI delay simulation in a simple manner.

To achieve the object, a statistical LSI delay simulation apparatus according to the present invention is a statistical LSI delay simulation apparatus which analyzes, in a designing stage, statistical delays of an LSI including a plurality of circuit cells, includes cell delay variation estimation means for estimating, with reference to a statistical property library indicating the dependency of a property variation on an operation condition in each said circuit cell, a variation in delay of the circuit cell based on a value for the operation condition in the circuit cell when the LSI is in an operation state, and simulates an operation with a delay variation of the LSI estimated by the cell delay variation estimation means.

With the statistical LSI delay simulation apparatus of the present invention, a delay variation of each circuit cell can be obtained with an operation condition in each said circuit cell taken into consideration and, furthermore, an LSI delay variation can be simulated using a signal transmission corresponding to a signal path or a cell operation. Therefore, the predictability of a timing yield is increased, and thus the reliability of a simulation is improved, compared to a known method in which a unique delay variation of a circuit cell is given to perform analysis. As a result, it becomes possible to directly evaluate, for each signal path, excess and deficiency of a design margin in LSI designing.

It is preferable that in the statistical LSI delay simulation apparatus of the present invention, each said circuit cell includes at least a transistor, and it is also preferable that the statistical LSI delay simulation apparatus further includes: a circuit simulator for obtaining the degree of a variation in operation property of the transistor; and a statistical property library generator for obtaining the dependency of the degree of a variation in operation property obtained for the transistor on the operation condition to generate the statistical property library.

It is preferable that the statistical LSI delay simulation apparatus of the present invention further includes a delay calculator for estimating a delay variation of each said circuit cell and an operation of the LSI is simulated based on the a delay variation of each said circuit cell estimated by the delay calculator.

In such a case, it is preferable that the cell delay variation estimation means is provided in the delay calculator.

It is preferable that in the statistical LSI delay simulation apparatus of the present invention, the property variation of each said circuit cell is a variation in signal propagation delay between input and output terminals of the circuit cell.

In such a case, it is preferable that the operation condition is a rise or fall time of an input signal in each said circuit cell.

Moreover, in such a case, it is preferable that the operation condition is output load capacitance for each said circuit cell.

It is preferable that in the statistical LSI delay simulation apparatus of the present invention, as the statistical property library, the dependency of a property variation on an operation condition in each said circuit cell is expressed in a data table format.

Moreover, it is preferable that in the statistical LSI delay simulation apparatus of the present invention, as the statistical property library, the dependency of a property variation on an operation condition in each said circuit cell is expressed as a function.

Moreover, it is preferable that in the statistical LSI delay simulation apparatus of the present invention, as the statistical property library, the property variation in each said circuit cell is estimated from a property of each said circuit cell under a specific condition.

Moreover, it is preferable that in the statistical LSI delay simulation apparatus of the present invention, as the statistical property library, the property variation of each said circuit cell is expressed as a normal distribution.

In such a case, it is preferable that in the statistical LSI delay simulation apparatus of the present invention, as the statistical property library, the standard deviation of the normal distribution is indicated so as to be proportional to an average property of each said circuit cell.

Furthermore, in such a case, it is preferable that in the statistical LSI delay simulation apparatus of the present invention, as the statistical property library, the standard deviation of the normal distribution is expressed by a plurality of proportional relationships with a property of each said circuit cell.

It is preferable that when the property variation of each said circuit cell is expressed as a normal distribution, as the statistical property library, the standard deviation of the normal distribution is obtained from a rise or fall time of input signal and output load capacitance of each said circuit cell.

Moreover, it is preferable that as the statistical property library, the standard deviation of the normal distribution is normalized with an average value of delays.

It is preferable that the statistical LSI delay simulation apparatus of the present invention further includes timing yield estimation means for estimating a timing yield from the delay variation of the LSI.

Moreover, it is preferable that in the statistical LSI delay simulation apparatus of the present invention, the range of the delay variation of the LSI is divided into at least two parts, statistical delay simulation is preformed to each said divided part and the timing yield is calculated for each said divided part from a result of the simulation, whereby a timing yield of the LSI is obtained with the timing yield of each said divided part taken into consideration.

A statistical LSI delay simulation method according to the present invention is a simulation method for analyzing, in a designing stage, statistical delays of an LSI including a plurality of circuit cells, the statistical LSI delay simulation method comprising the steps of: generating a statistical property library indicating the dependency of a property variation on an operation condition in each said circuit cell; estimating a property variation based on a value for the operation condition of each said circuit cell when the LSI is in an operation state; and simulating an operation including an estimated delay variation in the LSI.

It is preferable that the statistical LSI delay simulation method of the present invention further includes the process step of estimating a timing yield from the delay variation of the LSI.

BRIEF DESCRIPTION OF THE DRAWINGS

FIG. 8 is a description showing a format of the statistical LSI delay information for the first embodiment.

FIG. 19 is a table showing an example for asymmetrical derating factors dealt with by the statistical delay simulation apparatus of the modified example of the fourth embodiment.

FIG. 23 is a table showing general derating factors in an LSI.

DESCRIPTION OF THE PREFERRED EMBODIMENTS (First Embodiment)

An embodiment of the present invention will be described with reference to the accompanying drawings.

Figure 1:
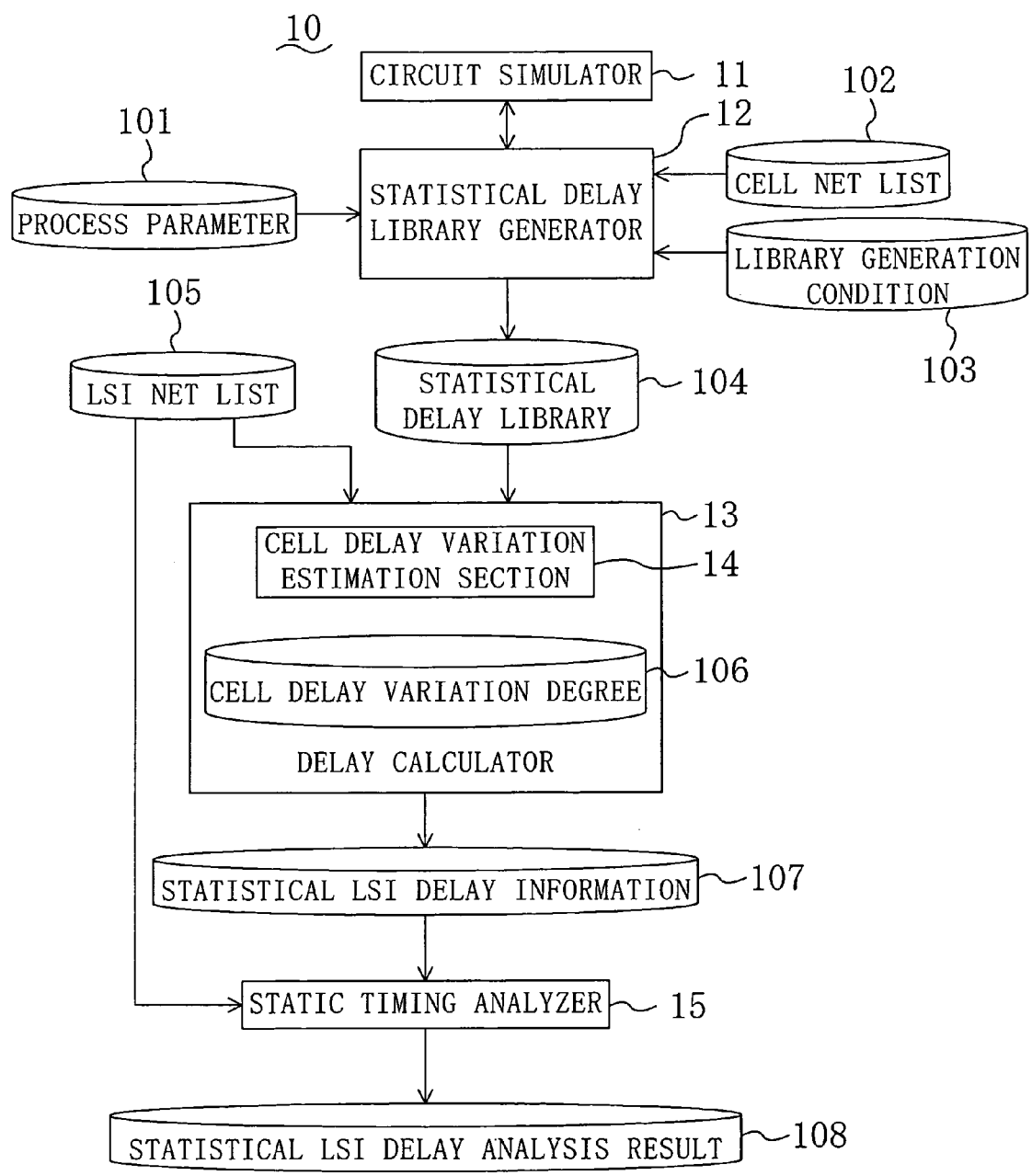
FIG. 1 is a block diagram illustrating a statistical LSI delay simulation apparatus according to a first embodiment of the present invention.

FIG. 1 is a block diagram illustrating the configuration of a statistical LSI delay simulation apparatus according to a first embodiment of the present invention.

As shown in FIG. 1, a statistical LSI delay simulation apparatus 10 of this embodiment includes a circuit simulator 11 for simulating the circuit operation of each circuit cell constituting an LSI to be analyzed, a statistical delay library generator 12 for driving the circuit simulator 11 to generate a statistical delay library 104, a delay calculator 13 for calculating a delay amount of each circuit cell in the LSI to be analyzed to generate a statistical LSI delay information file 107 containing delay data for each circuit cell, a static timing analyzer 15 for simulating, based on the data contained in the statistical LSI delay information file 107, the operation of the LSI to be analyzed with a delay variation to generate a statistical LSI delay analysis result file 108. In this case, for example, Star-Hspice from Avant! Corporation (USA) or the like is used as the circuit simulator 11.

The statistical delay library generator 12 generates, based on a process parameter 101 containing fabrication conditions, a cell netlist 102 containing transistor level connection information, and a library generation condition 103 containing various conditions necessary for starting the circuit simulator 11, a statistical delay library 104 in which the dependency of a delay variation of each circuit cell on predetermined operation conditions is described.

The delay calculator 13 reads the statistical delay library 104 and an LSI netlist 105 in which connection information for each circuit cell constituting an LSI to be analyzed is described, and then calculates delays of all of circuit cells constituting the LSI.

In this case, the LSI netlist 105 is described in the format of DSPF (detailed standard parasitic file described in, e.g., Cadence Design Systems, Inc., *Cadence Standard Parasitic Format* (1993), pp. 8–20) or the like. Note that to further increase precision, it is desirable that parasitic element information such as the parasitic capacitance and parasitic resistance of an interconnect between circuit cells are also described as contained information in the LSI netlist 105.

As a feature of the first embodiment, the delay calculator 13 includes a cell delay variation estimation section 14 for estimating the degree of a variation in delay of each circuit cell constituting an LSI to be analyzed to generate a delay variation degree file 106 with reference to the statistical delay library 104.

The static timing analyzer 15 for referring to the LSI netlist 105 has not only the function as the known static timing analyzer but also the function of statistically calculating delays under the assumption of a normal distribution. In general, a known static timing analyzer does not have the statistical calculation function. For example, PrimeTime from Synopsys, Inc. (USA) or the like is known as a known static timing analyzer.

Hereinafter, the operation of the statistical LSI delay simulation apparatus having above-described configuration will be described with reference to the accompanying drawings.

First, an exemplary circuit cell constituting an LSI, the process parameter 101, the cell netlist 102, and a library generation condition 103 which are necessary information for generation of a statistical delay library will be described.

Figure 2:
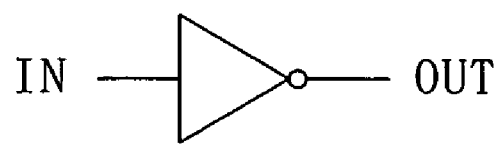
FIG. 2 is a logic circuit diagram of an inverter which is an exemplary circuit cell as a subject to be simulated in the present invention.
Figure 3:
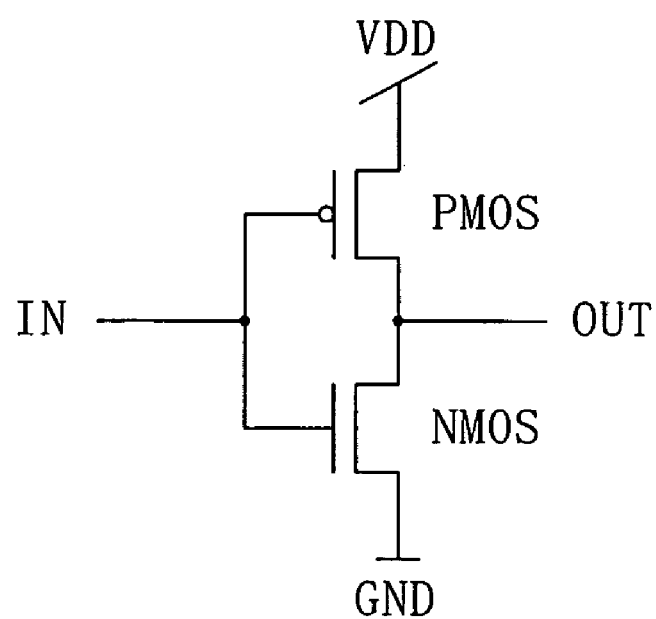
FIG. 3 is a transistor circuit diagram of an inverter which is an exemplary circuit cell as a subject to be simulated in the present invention.

FIG. 2 illustrates an exemplary circuit cell, i.e., a logic level inverter. FIG. 3 illustrates a transistor level inverter. More specifically, a CMOS circuit including a PMOS transistor and an NMOS transistor is illustrated in FIG. 3.

As shown in FIGS. 2 and 3, a circuit cell normally includes an input terminal IN, an output terminal OUT, a power supply terminal VDD, and a ground terminal GND. Furthermore, some circuit cells include each of the above-described terminals in a plural number.

In the process parameter 101, a SPICE (simulation program with integrated circuit emphasis) parameter, a parameter indicating a variation, parameters used in fabrication process steps and the like are stored. Note that details of the SPICE format and the SPICE parameter are described in, e.g., *Star-Hspice Manual*, release 2000.2. May 2000 issued by Avant! Corporation.

In the cell netlist 102, netlists of various circuit cells are stored. Circuit cells normally prepared in a standard cell library of an ASIC (application specific integrated circuit) include not only an inverter but also a NAND gate, a NOR gate, a flipflop, and the like. Moreover, besides these widely used circuit cells, some other necessary circuit cell for an LSI can be formed so as to be a subject for which the statistical delay library 104 is generated. A netlist stored in the cell netlist 102 is normally described in the SPICE format and includes information, such as size, connection information, values for a passive element and a parasitic element and the like, for transistors constituting each circuit cell.

In the library generation condition 103, various kinds of information necessary for the statistical delay library generator 12 to start the circuit simulator 11 for analysis, such as a voltage condition, a temperature condition, a condition for entering a circuit simulation job and the like, are stored.

(Statistical Delay Library Generation Process Step)

Hereinafter, the operation of the statistical delay simulation apparatus of the first embodiment will be described.

First, in the process step of generating a statistical delay library, the statistical delay library generator 12 determines a type of circuit cells to be a subject for which a library is generated and then reads the process parameter 101 while reading a netlist for the determined circuit cell from the cell netlist 102. Subsequently, the circuit simulator 11 is started to estimate, as a variation in transistor property, the dependency of the degree of variation in propagation delay between the input and output terminals of a circuit cell to be analyzed on predetermined operation conditions by simulation using, e.g., the Monte Carlo method.

Figure 4:
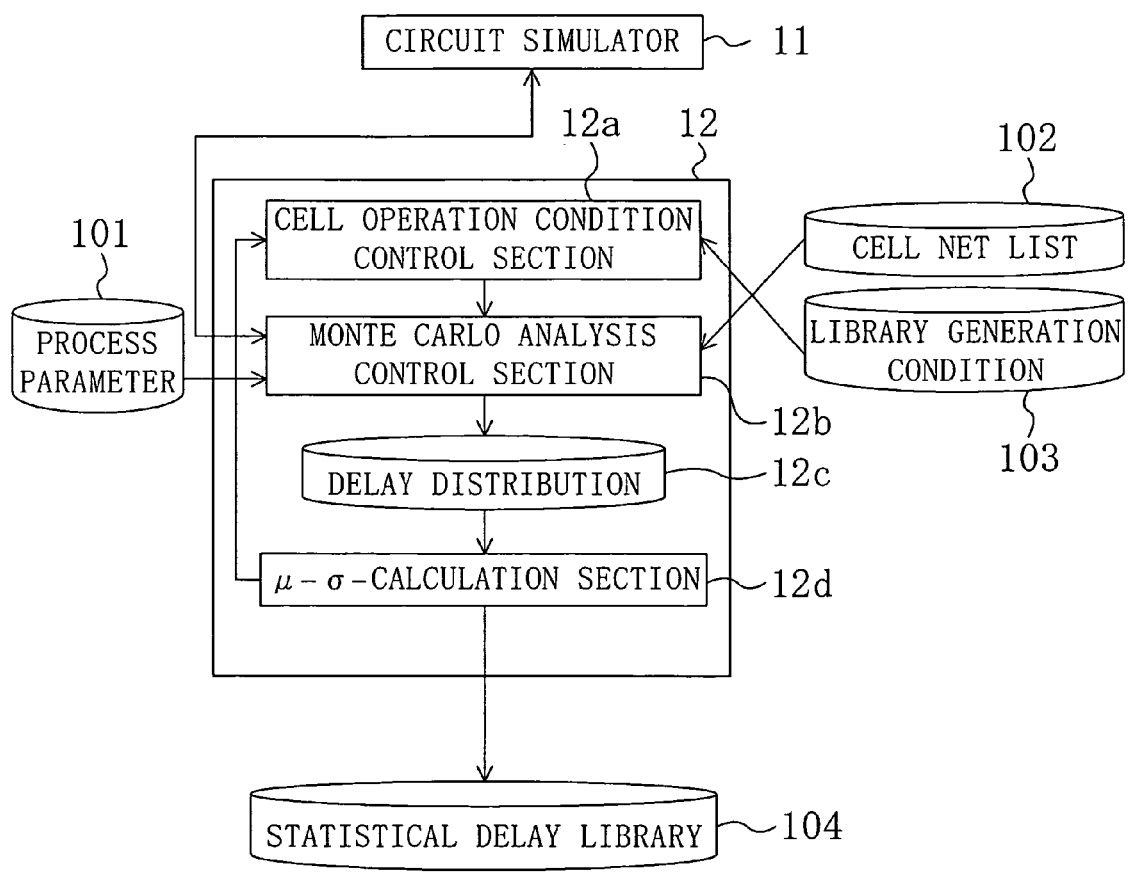
FIG. 4 is a block diagram illustrating an exemplary statistical delay library generator constituting the statistical LSI delay simulation apparatus of the first embodiment.

FIG. 4 illustrates an example of a specific configuration of the statistical delay library generator 12 when the Monte Carlo method is used as a simulation method.

As shown in FIG. 4, the statistical delay library generator 12 of the first embodiment includes a cell operation condition control section 12a which operates based on the library generation condition 103, a Monte Carlo analysis control section 12b which operates based on the cell netlist 102 to generate a delay distribution file 12c, and a μ-σ-calculation section 12d for calculating an average value μ and a standard deviation value σ of delays which will be described later with reference to the delay distribution file 12c. Note that the Monte Carlo method, as it is known, is a statistical analysis method in which using as an input variable a random number generated according to a specific probability distribution, a regular analysis is repeatedly performed for each random number and then analysis results are put together, thereby obtaining a probability distribution of an output value (i.e., the delay distribution file 12c).

In the first embodiment, as predetermined operation conditions, output load capacitance of a circuit cell and a rise or fall time of an input signal are used. Moreover, a variation in propagation delay is expressed under the assumption of a normal distribution.

Figure 5:
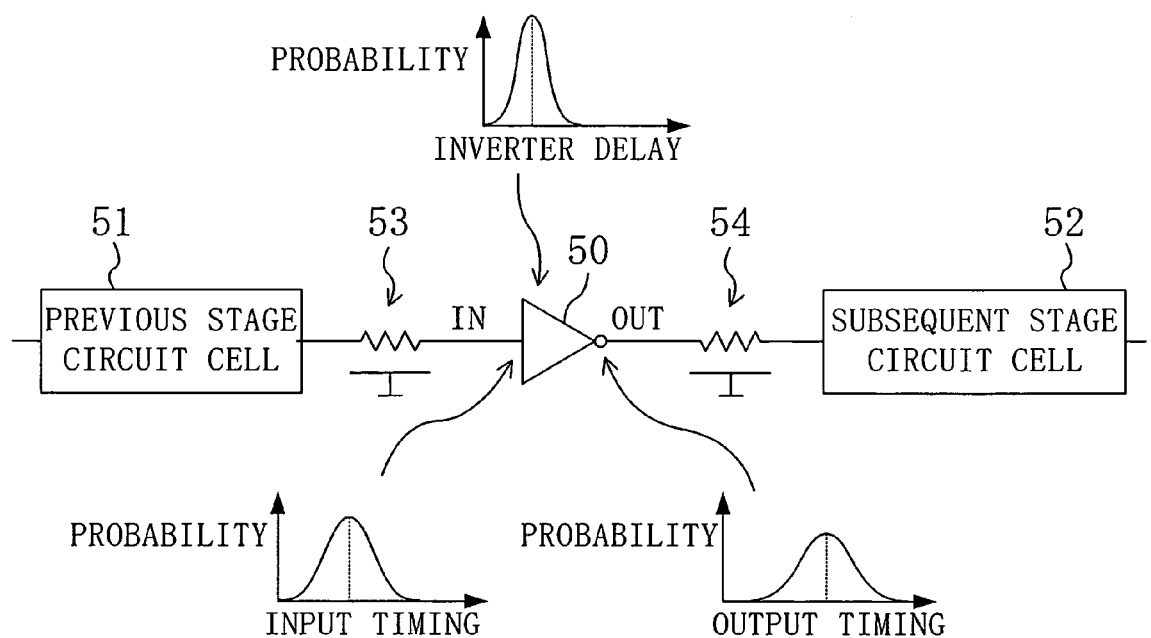
FIG. 5 is a circuit diagram schematically illustrating an exemplary signal path as a subject to be simulated in the present invention under the assumption that a delay distribution is a normal distribution.

FIG. 5 schematically illustrates how an output signal OUT with a normal distribution is output when an input signal IN with a normal distribution is received by an inverter 50 having a response of a normal distribution. In this case, assuming that an average value is μ and a standard deviation value is σ, f(t) which indicates these normal distributions and is a function of time t can be expressed as Equation 5, in general, and further expressed as a functional symbol N (μ, σ²). Moreover, the reference numeral 53 denotes a first interconnect parasitic element including resistance and capacitance components between a previous stage circuit cell 51 and an inverter 50, and in the same manner, the reference numeral 54 denotes a second interconnect parasitic element including resistance and capacitance components between the inverter 50 and a subsequent stage circuit cell 52.

$$f(t) = \frac{1}{\sqrt{2\pi}\,\sigma}\exp\left(\frac{-(t-\mu)^2}{2\sigma^2}\right) = N(\mu, \sigma^2) \qquad \text{[Equation 5]}$$

The statistical delay library generator 12 sets two operation conditions (output load capacitance and rise or fall time of an input signal) at predetermined values, respectively, and then transfers these values to the circuit simulator 11 with the netlist information and the process parameter information in a circuit cell which have been already read.

The circuit simulator 11 to which the above-described information has been transferred obtains the degree of a variation in properties of each transistor of the circuit cell while changing the SPICE parameter and values in the netlist. For example, in the case of a CMOS transistor, each of parameters such as a gate length, the thickness of a gate oxide film, and a threshold voltage is changed.

Next, as shown in FIG. 4, the statistical delay library generator 12 receives the degree of a variation in properties of each transistor of the circuit cell from the circuit simulator 11 and obtains, in the μ-σ-calculation section 12d, the average value μ and the standard deviation value σ of a normal distribution of delays, i.e., the delay variation distribution of the circuit cell.

Furthermore, the statistical delay library generator 12 repeatedly performs, in the cell operation condition control section 12a, the above-described operation of obtaining an average value μ and a standard deviation value σ while changing values for two operation conditions within an appropriate range and also while changing the combination of input and output terminals of the circuit cell to be analyzed or the combination of transition directions (rise and fall) of input and output signals. In this manner, the dependency of delay variation distribution of the circuit cell under two operation conditions are obtained.

The dependencies of average value μ and standard deviation value σ of delays on operation conditions are expressed in a function format or a data table format. Furthermore, the dependencies are output to the statistical delay library 104 with output driving ability information for the circuit cell, input capacity information for the circuit cell, logic information and the like. In this case, the output driving ability information for the circuit cell is expressed as, e.g., current ability or output resistance of an output transistor.

The above-described operation is performed to necessary circuit cells which are stored in the cell netlist 102 one by one, thereby generating the statistical delay library 104 indicating the dependency of the degree of a variation in properties of a circuit cell on predetermined operation conditions.

In this manner, the statistical delay library 104 of the first embodiment uses, as the degree of a variation in properties of a circuit cell, the degree of a variation in delay of signal propagation between the input and output terminals of the circuit cell and also uses, as predetermined operation conditions, a rise or fall time of an input signal and an output load capacitance of the circuit cell.

Figure 6:
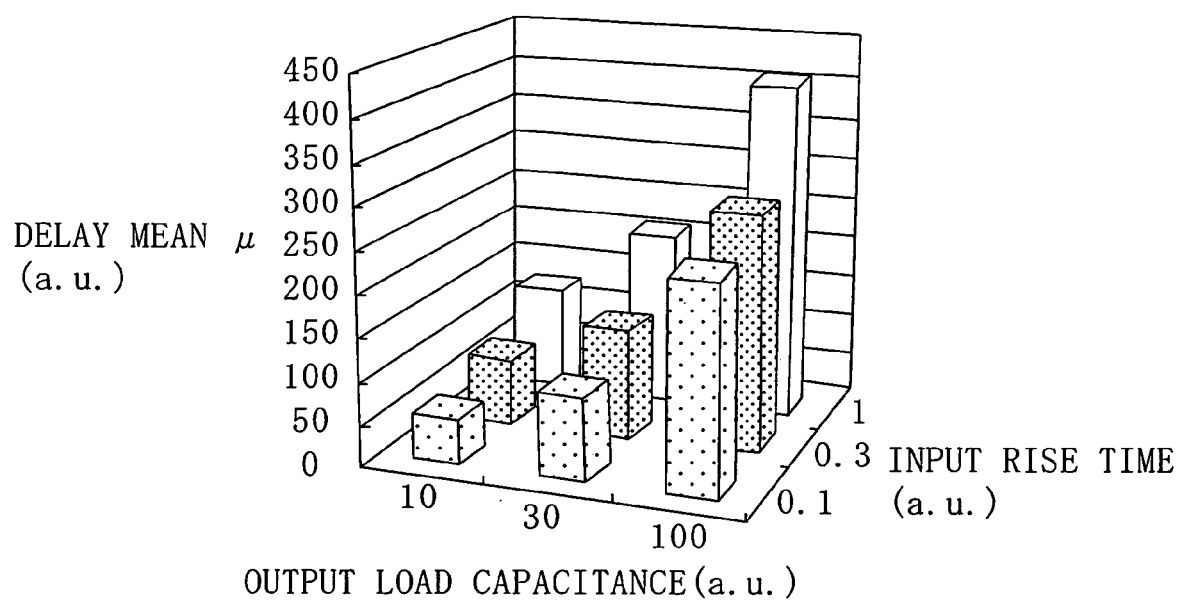
FIG. 6 is a graph showing an example in which the dependency of a delay average output by a statistical delay library generator constituting the statistical LSI delay simulation apparatus of the first embodiment on an input rise time and an output load capacitance.
Figure 7:
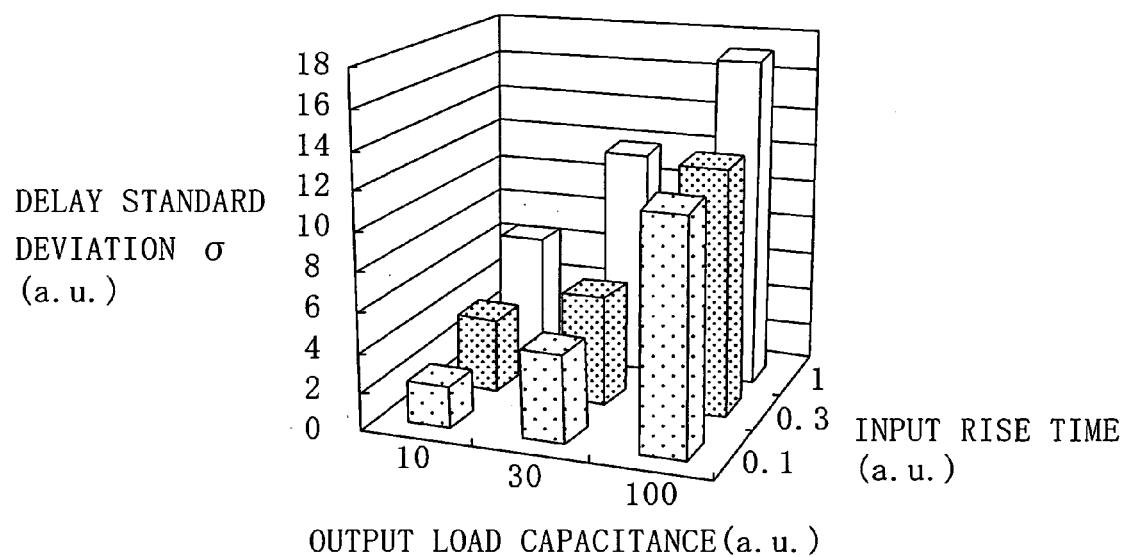
FIG. 7 is a graph showing an example in which the dependency of a delay standard deviation output by a statistical delay library generator constituting the statistical LSI delay simulation apparatus of the first embodiment on an input rise time and an output load capacitance.

FIGS. 6 and 7 illustrate an example in which as a variation in delay of a circuit cell of the statistical delay library 104 of the first embodiment, the dependency of the average value μ of a delay distribution in a transition direction between the input and output terminals of the circuit cell on operation conditions is first shown in a data table format and then in a graph format and an example in which as a variation in delay of a circuit cell of the statistical delay library 104 of the present invention, the dependency of the standard deviation value σ of the delay distribution in the transition direction between the input and output terminals of the circuit cell on operation conditions is first shown in a data table format and then in a graph format, respectively. As shown in FIGS. 6 and 7, the delay average value μ and the delay standard deviation value σ are indicated with respect to two operation conditions, i.e., values for a rise or fall time of an input signal and an output load capacitance in this case.

Note that in the statistical delay library 104, information shown in each of FIGS. 6 and 7 can be expressed as a function. When such information is expressed as a function such as Equations 6 and 7, functions $f_\mu$ and $f_\sigma$ including unknowns can be defined in advance, and the unknowns can be determined by curve fitting so that defined functions match to the relationship, expressed in a data table format based on FIG. 6, between operation conditions and the delay average value and the relationship, expressed in a data table format based on FIG. 7, between the operation conditions and the delay standard deviation value.

$$\mu = f_\mu(t_{risefall}, C_{load}) \quad \text{[Equation 6]}$$

$$\sigma = f_\sigma(t_{risefall}, C_{load}) \quad \text{[Equation 7]}$$

In Equations 6 and 7, $t_{risefall}$ indicates rise time and (or) fall time of an input signal and $C_{load}$ indicates an output load capacitance.

(Cell Delay Variation Estimation Process Step)

Next, in the process step of estimating a cell delay variation, the cell delay variation estimation section 14 included in the delay calculator 13 determines, among circuit cells constituting an LSI, a circuit cell to be estimated and then obtains, for the determined circuit cell, an output load capacitance and a rise or fall time of an input signal which are operation conditions for the LSI.

Hereinafter, as an example, propagation delays between the input and output terminals of the inverter 50 which is a circuit cell included in a signal path shown in FIG. 5 are calculated.

Connection information in the signal path of FIG. 5 is described in the LSI netlist 105 with parasitic element information for an interconnect.

First, a load capacitance connected to the output terminal of the inverter 50 is obtained. In this case, the sum of the interconnect capacitance of the second interconnect parasitic element 54 and the input capacitance of the subsequent stage circuit subsequently connected to the second interconnect parasitic element 54 is the output load capacitance. Then, the LSI netlist 105 is referred to for information for the second interconnect parasitic element 54, and the statistical delay library 104 is referred to for information for the input capacitance in the subsequent stage circuit cell 52.

Next, a rise or fall time of an input signal received by the input terminal of the inverter 50 is obtained based on the relationships with an output driving ability of the previous stage circuit cell 51, the first interconnect parasitic element 53, an input capacitance of the inverter 50 and the like. Then, the output driving ability in the previous circuit cell 51 can be obtained by referring to the statistical delay library 104. In this manner, an output load capacitance and a rise or fall time of an input signal for the inverter 50 are obtained.

Subsequently, values for the delay average μ and the delay standard deviation σ, which are parameters indicating a variation in propagation delay between the input and output terminals of the inverter 50 based on the obtained output load capacitance and rise or fall time of an input signal for the inverter 50 with reference to the statistical delay library 104. Then, in the statistical delay library 104, if the dependency of the degree of a delay variation of a circuit cell on operation conditions is expressed as a function, extracted values for operation conditions can be substituted in the function to obtain a delay variation of the circuit cell to be estimated.

On the other hand, when the dependencies of the degree of a delay variation in a circuit cell on operation conditions shown in FIGS. 6 and 7 are illustrated in a data table format in the statistical delay library 104, appropriate interpolation or extrapolation can be performed according to extracted values for operation conditions, thereby obtaining the degree of a delay variation in the circuit cell to be estimated.

The process step of obtaining a delay average value μ and a delay standard deviation value σ is performed to all of circuit cells constituting the LSI and then obtained results are stored in the delay variation degree file 106. Furthermore, for all of the circuit cells constituting the LSI, the delay calculator 13 outputs statistical delay information to the statistical LSI delay information file 107 based on the cell delay variation degree file 106.

Statistical LSI delay information stored in the statistical LSI delay information file 107 is described in a known format for delay information, such as SDF (standard delay format). For example, part of the format described in *Standard Delay Format Specification Version* 3.0, 1995 issued by Open Verilog International is used. That is to say, the known SDF can describe a fixed, specific delay value but can not describe a distribution of delays.

Then, in the first embodiment, a method in which the average value µ of a normal distribution of delays is described in an SDF and the standard deviation value σ thereof is described as an newly added file so that the standard deviation value σ corresponds to the average value µ of each circuit cell in an SDF file is used.

An example of description of statistical LSI delay information when an output value O in an inverter (INV) circuit cell X15 is connected to an input value I in an circuit cell X16 through an interconnect is shown in FIG. 8.

As shown in FIG. 8, as the average value µ of delays of a circuit cell, each of values for rise and fall of a signal, i.e., 0.362 and 0.455, is described in an IOPATH portion of an SDF file. In the same manner, as an average value of interconnect delays, a value for both of rise and fall of a signal, i.e., 0.002, is described in an INTERCONNECT portion.

In an additional file, as a value for the delay standard deviation σ of the circuit cell X15, each of values for rise and fall of a signal, i.e., 0.029 and 0.036 is described so that the circuit cell X15 in the additional file corresponds to that in the SDF file.

In this manner, the statistical LSI delay information file 107 is formed of the SDF file and the additional file in the first embodiment.

(Timing Simulation Process Step)

Figure 22:
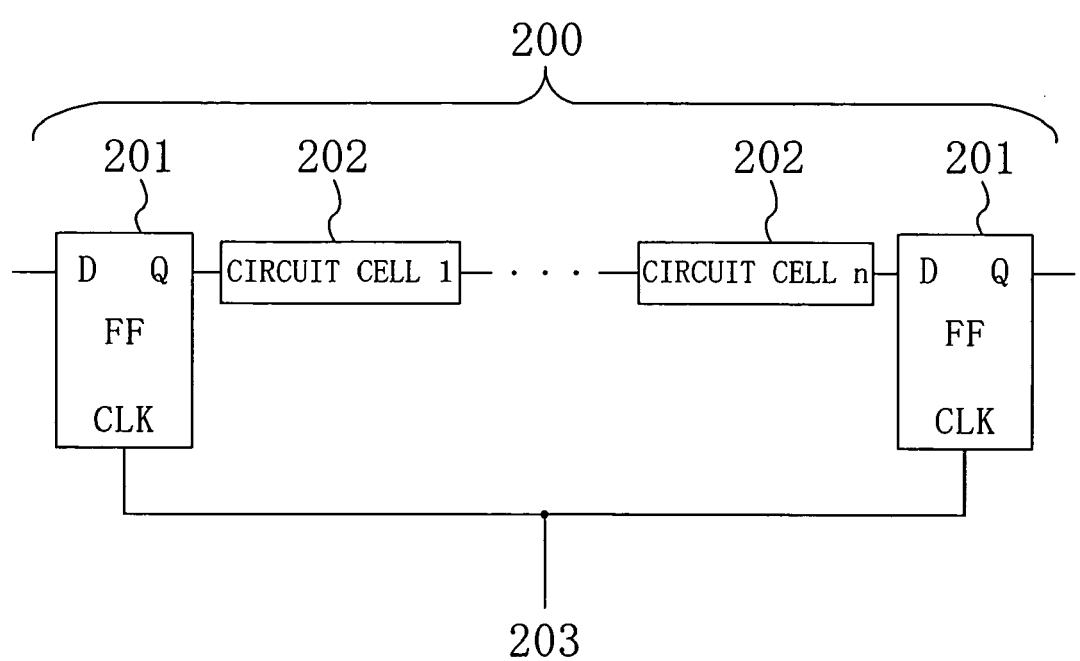
FIG. 22 is a block diagram illustrating a general configuration of a signal path in an LSI.

Next, in the process step of timing simulation, the static timing analyzer 15 reads the LSI netlist 105 and the statistical LSI delay information file 107. Assuming that the signal path in the circuit of FIG. 22 is a subject to be simulated, a signal is propagated through each of circuit cells 201, 202 . . . in this order from an input side of the signal path to an output side of the signal path. In this case, a delay distribution is dealt with under the assumption of a normal distribution. Thus, for example, when the circuit cell 202 includes n stages, the delay average $\mu_{path}$ of the signal path is obtained based on Equation 8 and the delay standard deviation $\sigma_{path}$ of the signal path is obtained based on Equation 9.

In this manner, static timing analysis of an LSI in which a delay variation is taken into consideration is performed to all of signal paths, and then obtained results are output to the statistical LSI delay analysis result file 108.

$$\mu_{path} = \sum_{i=1}^{n} \mu_i \qquad \text{[Equation 8]}$$

$$\sigma_{path} = \sqrt{\sum_{i=1}^{n} \sigma_i^2} \qquad \text{[Equation 9]}$$

where i is i=1, 2, . . . n and n is 1 or an integer larger than 1.

As has been described, according to the first embodiment, the degree of a variation in delay of each of a plurality of circuit cells constituting an LSI to be simulated is obtained according to operation conditions of each of the circuit cells with reference to the statistical delay library 104. Subsequently, based on the obtained degree of a variation in delay of each of the circuit cells, the delay average and delay standard deviation of each of the circuit cells in the LSI are estimated under the assumption of a normal distribution. An operation timing of the LSI is analyzed using results obtained from the estimation, so that a simulation in which a delay variation phenomenon of a signal path in an actual operation of the LSI is taken into consideration can be performed in a simple manner and with high accuracy. Accordingly, in the process step of designing an LSI, an excessive specification to cope with a delay variation can be avoided and the number of process steps can be largely reduced.

In the first embodiment, as expressed by Equation 9, an example in which a delay variation of each circuit cell is a random variation has been described. This is suitable for indicating a variation component caused by within-die variability. However, a fabrication variation which actually occurs also includes a variation component caused by die-to-die variability. When it is intended to obtain a delay variation $\sigma_{path}$ of a signal path due to a variation component caused by die-to-die variability, in a timing simulation process step, the static timing analyzer 15 can perform calculation, for example, based on the following Equation 10, instead of Equation 9, thereby obtaining the delay variation $\sigma_{path}$.

$$\sigma_{path} = \sum_{i=1}^{n} \sigma_{die\text{-}to\text{-}die_i} \qquad \text{[Equation 10]}$$

where $\sigma_{die\text{-}to\text{-}die}$ is a standard deviation value for delays caused by die-to-die variability in an ith stage in a signal path. Thus, as in the first embodiment in which within-die variability is assumed, a delay standard deviation value for each circuit cell based on die-to-die variability may be obtained and then stored in the statistical delay library 104 in advance.

Furthermore, when a fabrication variation includes variation components caused by both of within-die variability and die-to-die variability, the following Equation 11 may be used instead of equation 9. In this case, a delay standard deviation value for each circuit cell based on predetermined die-to-die variability and predetermined die-to-die variability may be obtained and then stored in the statistical delay library 104 in advance.

$$\sigma_{path} = \sqrt{\sum_{i=1}^{n} \sigma_i^2 + \left(\sum_{i=1}^{n} \sigma_{die\text{-}to\text{-}die_i}\right)^2} \qquad \text{[Equation 11]}$$

Note that in the first embodiment, the inverter with an input terminal and an output terminal has been described as a specific example of a circuit cell. However, the present invention is not limited thereto, but the degree of a delay variation can be estimated for a circuit cell including a plurality of input terminals and a plurality of output terminals in the same manner as in this embodiment. Note that when at least one of input and output terminals is provided in a plural number, it is necessary to estimate the degree of a delay variation between each input terminal and each output terminal, i.e., for each combination of input and output terminals.

Moreover, an example in which the average value μ of delays is stored in the SDF file and the standard deviation value σ thereof is stored in the additional file in the statistical LSI delay information file 107 has been described. However, the present invention is not limited thereto, but the delay calculator 13 may be configured so that both of the delay average value μ and the standard deviation value σ are stored together in a file.

Moreover, the output load capacitance of a circuit cell is the sum of the interconnect capacitance in an interconnect at the output side of the circuit cell and the input capacitance of the subsequent stage circuit cell subsequently connected to the interconnect. However, instead of this, equivalent capacitance of these values may be used.

Moreover, an example in which Star-Hspice is used for the circuit simulator 11 has been described. However, a circuit simulator which can perform simulation of a circuit operation with a delay variation taken into consideration can be used as the circuit simulator 11. For example, a device simulator of TCAD (technology CAD) can be used.

Moreover, the statistical delay library generator 12 of the first embodiment uses the Monte Carlo method as a method for simulating a variation in properties of a transistor in a circuit cell. However, the simulation method is not limited to the Monte Carlo method.

For example, as in this embodiment, when a delay amount is treated as a normal distribution, a method in which the sensitivity of a circuit cell property f with respect to a variant $P_i$ which gives a variation is calculated based on Equation 12 and then the standard deviation of the circuit cell property is obtained from Equation 12 and the standard deviation $\sigma_i$ of each variant $P_i$ based on Equation 13 may be used.

$$\frac{\partial f}{\partial P_i}$$ [Equation 12]

$$\sqrt{\sum_{i=1}^{k}\left(\frac{\partial f}{\partial P_i}\right)^2 \sigma_i^2}$$ [Equation 13]

Figure 9:
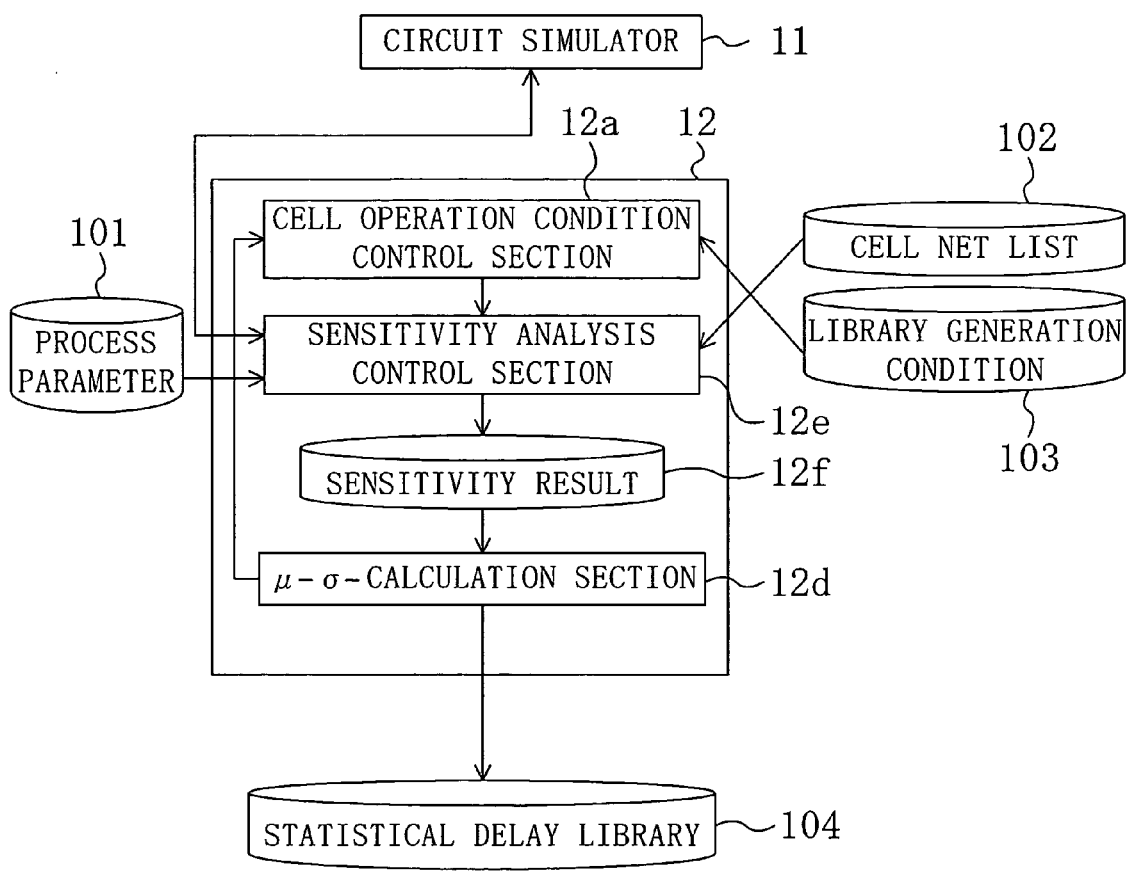
FIG. 9 is a block diagram illustrating a statistical delay library generator constituting a statistical LSI delay simulator according to a modified example of the first embodiment.

In FIG. 9, illustrated is a modified example in which instead of the Monte Carlo analysis control section 12b in the statistical delay library generator 12, a sensitivity analysis control section 12e for calculating sensitivity components indicated in Equation 12 is used. In this modified example, a sensitivity component obtained for each cell is output to a sensitivity result file 12f. In this manner, a circuit simulation time can be largely reduced, compared to the Monte Carlo method.

Furthermore, the first embodiment is so configured that only a delay variation of a circuit cell is dealt with. However, the configuration is not limited thereto, but may be made so that a variation in the interconnect parasitic effect as well as a delay variation of a circuit cell can be dealt with at the same time.

More specifically, for example, in FIG. 1, information for an interconnect delay variation is separately prepared and then the interconnect delay variation information is transmitted to the delay calculator 13. The delay calculator 13 calculates an interconnect delay average value $\mu_{wi}$ and an interconnect delay standard deviation $\sigma_{wi}$ for each interconnect delay, adds the interconnect delay average value $\mu_{wi}$ to INTERCONNECT components in the SDF file and then describes the obtained value. Moreover, the delay calculator 13 adds the interconnect delay standard deviation $\sigma_{wi}$ to the additional file so that the additional file corresponds to the SDF file, describes the obtained value, and then outputs the obtained value to the statistical LSI delay information file 107.

The static timing analyzer 15 in this case alternately and continuously performs delay distribution calculation when a signal passes through each of the circuit cells 201 and 202 from the input side of the signal path to the output side thereof and delay distribution calculation when a signal passes through an interconnect from the input side of the signal path to the output side thereof and then outputs calculation results as a statistical LSI delay analysis result file 108. Thus, the delay average value $\mu_{path}$ of the entire signal path can be obtained as Equation 14 and the delay standard deviation value $\sigma_{path}$ of thereof can be obtained as Equation 15. The integer m here is the number of interconnects between circuit cells on the signal path. In FIG. 22, m=n+1 holds.

$$\mu_{path} = \sum_{i=1}^{n} \mu_i + \sum_{i=1}^{m} \mu_{wi}$$ [Equation 14]

$$\sigma_{path} = \sqrt{\sum_{i=1}^{n} \sigma_i^2 + \sum_{i=1}^{m} \sigma_{wi}^2}$$ [Equation 15]

Moreover, in the first embodiment, output capacitance and a rise of fall time of an input signal are used as operation conditions of a circuit cell. However, the operation conditions are not limited thereto but may include, for example, a power supply voltage or temperature.

Moreover, processing of each of the statistical delay library generator 12, the delay calculator 13 and the static timing analyzer 15 shown in FIG. 1 may be automated by using a software (program). In that case, a form including a graphical user interface (GUI) may be used.

(Second Embodiment)

Hereinafter, a second embodiment of the present invention will be described with reference to the accompanying drawings.

Figure 10:
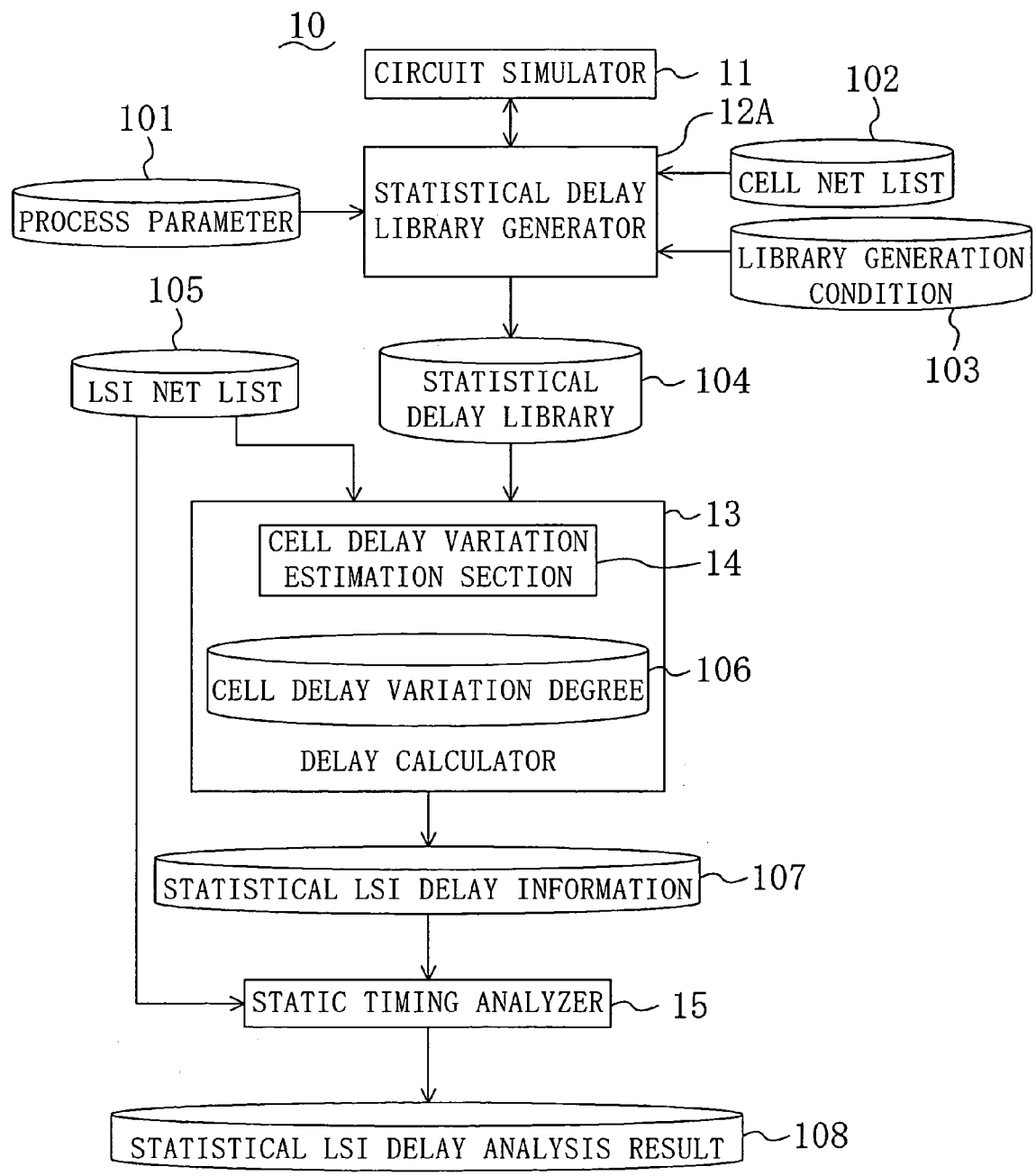
FIG. 10 is a block diagram illustrating a statistical LSI delay simulation apparatus according to a second embodiment of the present invention.

FIG. 10 is a block diagram illustrating the configuration of a statistical LSI delay simulation apparatus according to a second embodiment of the present invention. In FIG. 10, each member also shown in FIG. 1 is identified by the same reference numeral, and therefore description thereof will be omitted.

Unlike the first embodiment, even though a distribution of a variation in delay of a circuit cell is assumed to be a normal distribution, a statistical delay library generator 12A according to the second embodiment does not directly extract a delay average value μ and a delay standard deviation σ by circuit simulation, but extracts a delay average value μ and a delay standard deviation value σ' (where σ'=σ/μ) normalized with the delay average value μ. In this point, the second embodiment is different from the first embodiment.

Figure 11:
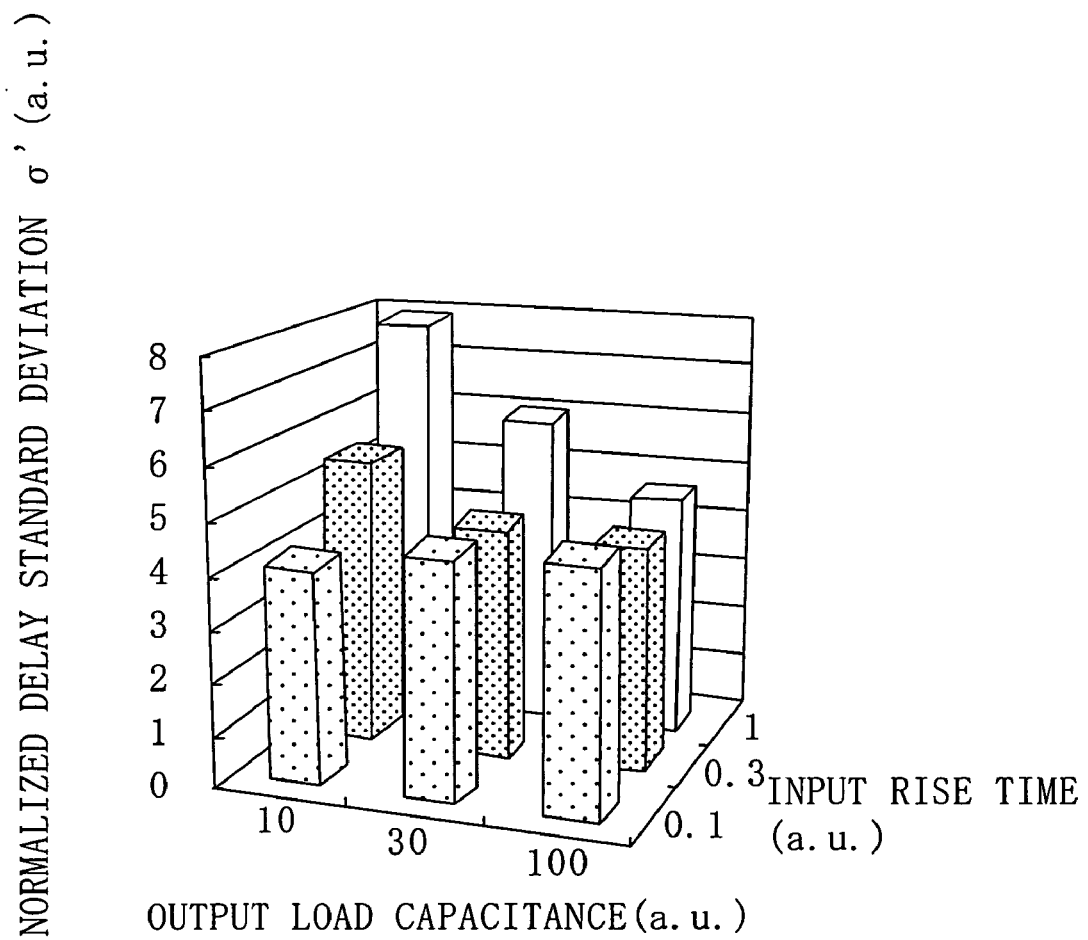
FIG. 11 is a graph showing an example in which the dependency of a normalized delay standard deviation output by a statistical delay library generator constituting the statistical LSI delay simulation apparatus of the second embodiment on an input rise time and an output load capacitance.

For the dependency of the degree of a delay variation on operation conditions, the statistical delay library generator 12A outputs, if a data table format is used, the results shown in FIG. 11 to the statistical delay library 104.

Next, the cell delay variation estimation section 14 constituting the delay calculator 13 calculates a delay average value μ and a normalized delay standard deviation value σ' from operation conditions of each circuit cell with reference to the statistical delay library 104.

In this case, the cell delay variation estimation section 14 of this embodiment further obtains a delay standard deviation value σ as (μ×σ') from the normalized delay standard deviation value σ' and the delay average value μ. Accordingly, the subsequent process steps are the same as those in the first embodiment.

The normalized delay standard deviation value σ' dealt with in the second embodiment plays a role as a ratio used for obtaining a delay standard deviation value σ when a delay average value μ is given. As long as the normalized delay standard deviation value σ' is obtained, the delay standard deviation value σ can be estimated in a simple manner by multiplying the delay average value μ by a value σ' of the ratio even in the case where a delay average value μ is different.

Specifically, based on Equations 14 and 15, the normalized delay standard deviation value σ' under a fabrication condition A is obtained in advance. Then, assume that another fabrication condition B is given. When calculation of the normalized delay standard deviation value σ' in the fabrication condition B is omitted and a delay standard deviation value σ under the fabrication condition B needs to be obtained, the normalized delay standard deviation value σ' can be used. Therefore, if there is no big difference between the fabrication condition A and the fabrication condition B, calculation can be performed in a simple manner even though the fabrication condition B which is a different condition from the fabrication condition A is given. In this case, the delay average μ in the fabrication condition A may be a value obtained by a known method or a known apparatus.

$$\sigma' = \sigma_{condition\ B}/\mu_{condition\ A} \qquad [\text{Equation 16}]$$

$$\sigma_{condition\ B} = \sigma'\mu_{condition\ B} \qquad [\text{Equation 17}]$$

Figure 12:
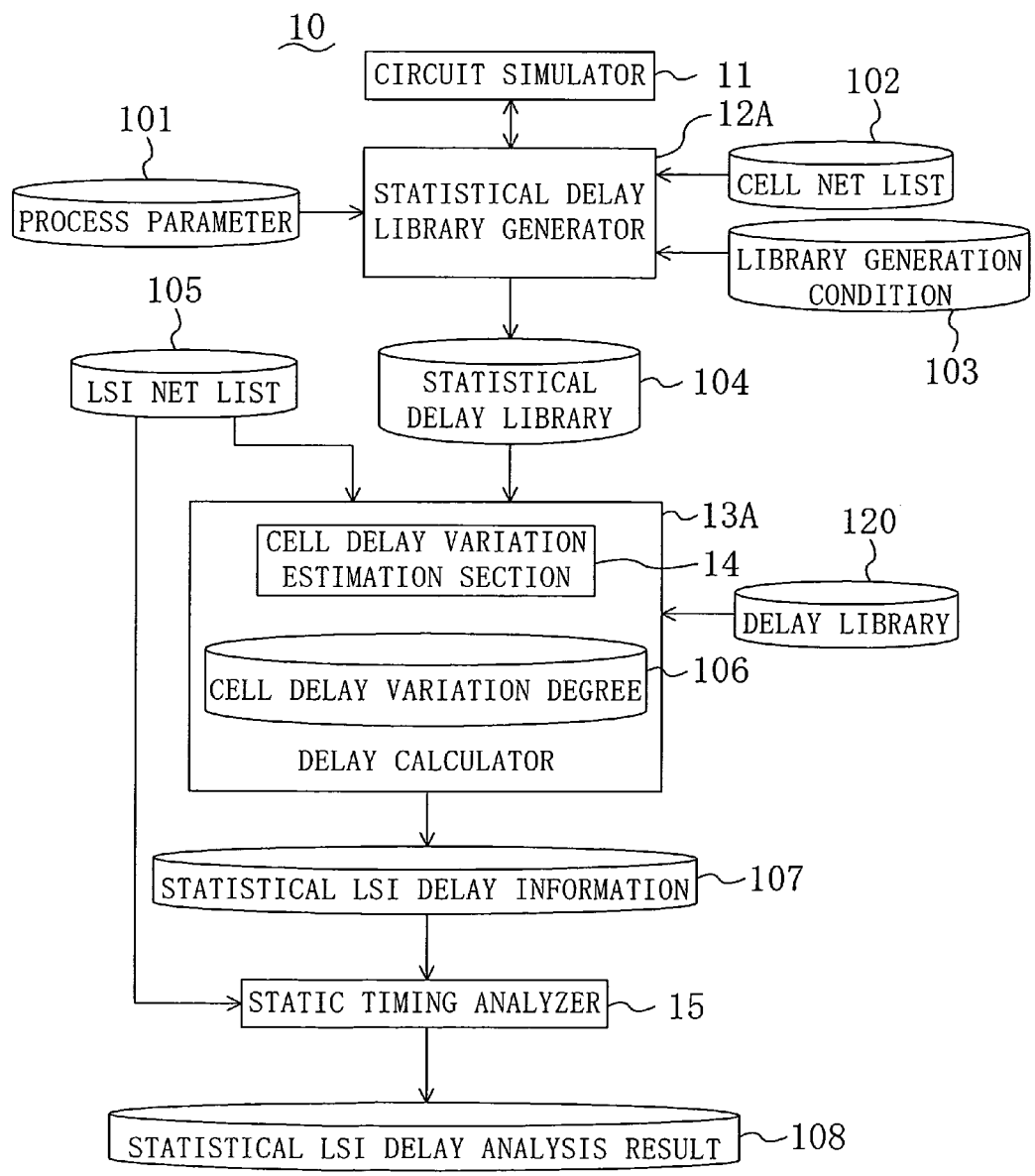
FIG. 12 is a block diagram illustrating another example of the statistical LSI delay simulation apparatus of the second embodiment.

An example of the configuration of the delay simulation apparatus under a different fabrication condition is shown in FIG. 12.

First, a delay library 120 containing the delay average μ under the fabrication condition B is prepared.

The delay calculator 13A of the second embodiment newly reads the delay library 120, so that the statistical delay library 104 contains the normalized delay standard deviation value σ' under the fabrication condition A. Furthermore, the delay calculator 13A obtains a delay standard deviation σ under the fabrication condition B from the relational expressions, i.e., Equations 16 and 17.

In this manner, according to the second embodiment, the same effects as those of the first embodiment can be achieved. Moreover, the normalized delay standard deviation value σ' indicates the broadening of a variation distribution with respect to the delay average value μ and can be used in the process steps of evaluating, based on the normalized delay standard deviation value σ', a difference in the delay distribution of each circuit cell and a difference in the delay distribution due to a difference in fabrication conditions, and furthermore, in specifying, based on the normalized delay standard deviation value σ', a region of an LSI which has a large variation. Therefore, the normalized delay standard deviation value σ' is useful information for optimizing design of LSIs.

(Third Embodiment)

Hereinafter, a third embodiment of the present invention will be described with reference to the accompanying drawings.

Figure 13:
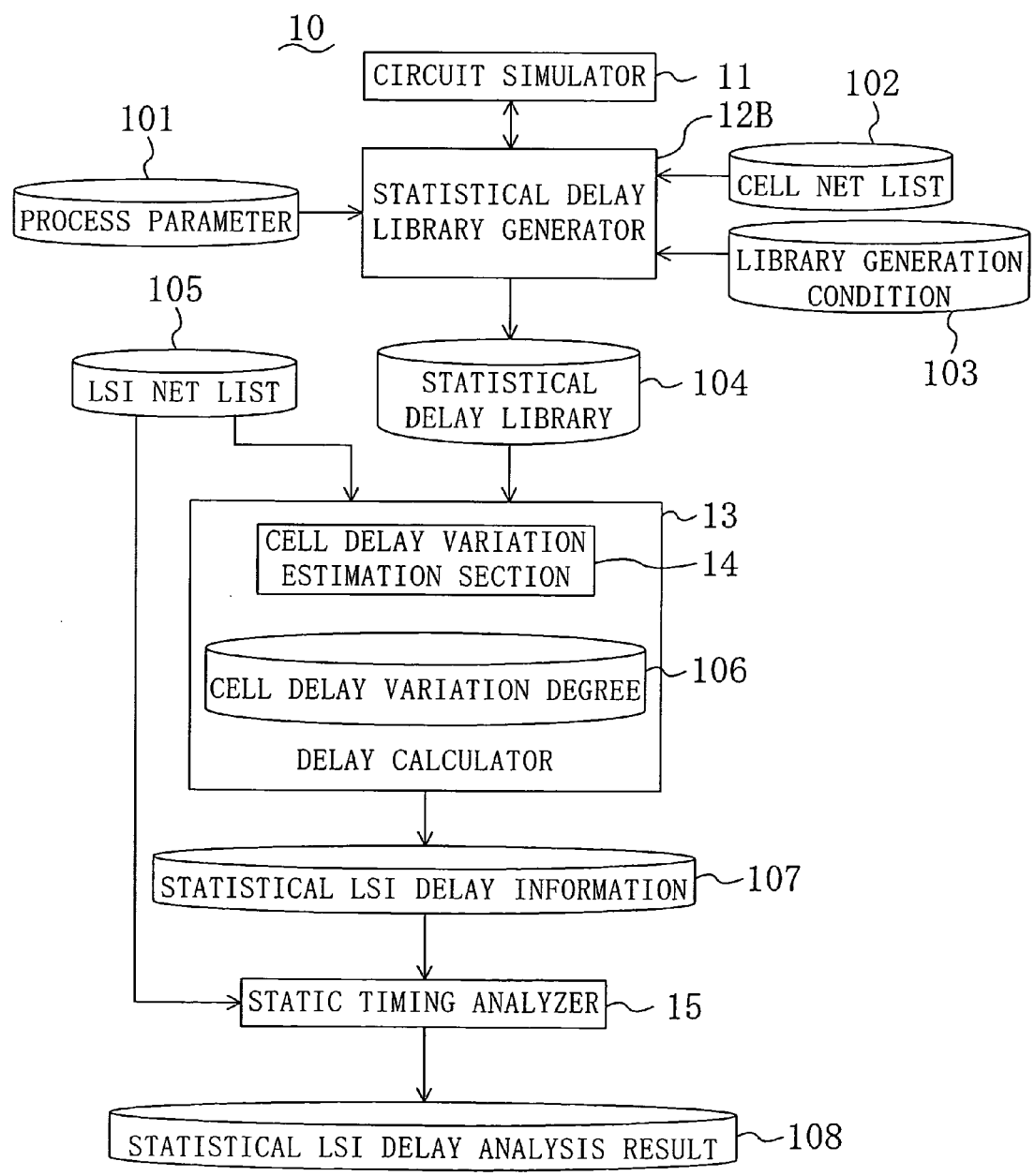
FIG. 13 is a block diagram illustrating a statistical LSI delay simulation apparatus according to a third embodiment of the present invention.

FIG. 13 is a block diagram illustrating the configuration of a statistical LSI delay simulation apparatus according to a third embodiment of the present invention. In FIG. 13, each member also shown in FIG. 1 is identified by the same reference numeral, and therefore description thereof will be omitted.

Unlike the first embodiment, even though a distribution of a variation of a circuit cell is assumed to be a normal distribution, a statistical delay library generator 12B according to the third embodiment does not directly extract a delay average value μ and a delay standard deviation σ by circuit simulation, but obtains a delay average value μ and then obtains a delay standard deviation value σ from the obtained delay average value μ. In this point, the third embodiment is different from the first embodiment.

Figure 14:
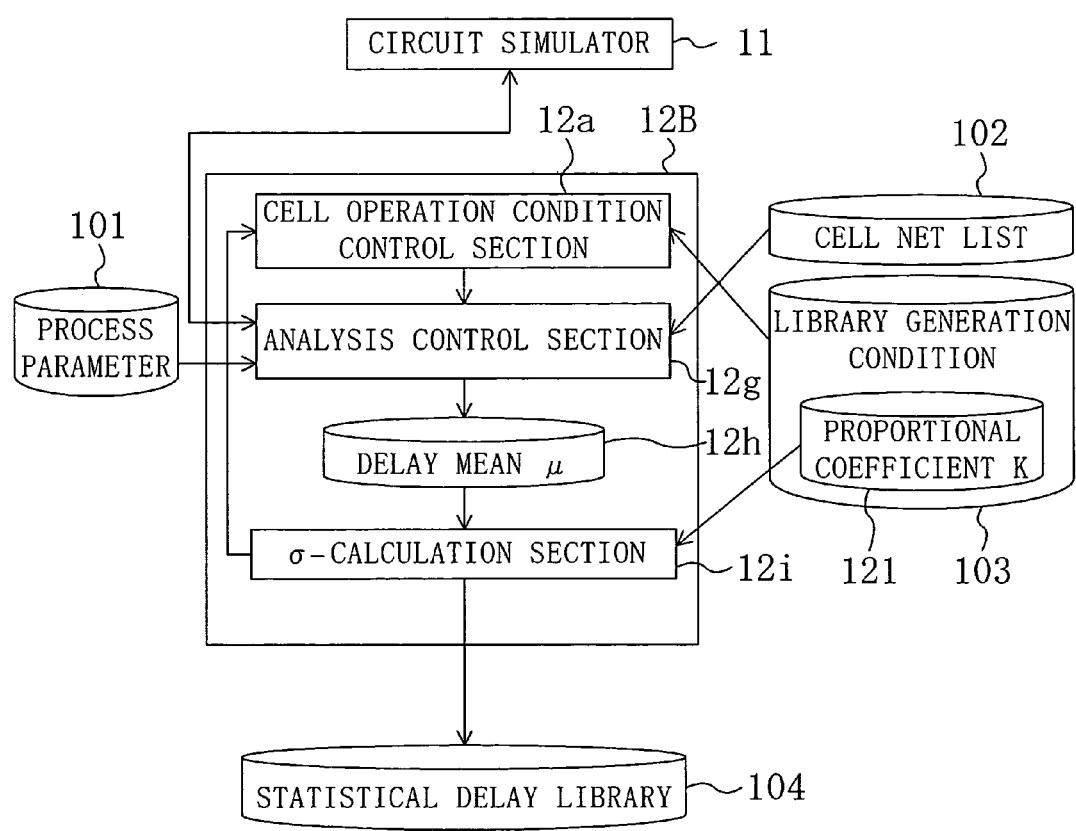
FIG. 14 is a block diagram illustrating a statistical delay library generator constituting the statistical LSI delay simulation apparatus of the third embodiment.

FIG. 14 illustrates an example of a specific configuration of the statistical delay library generator 12B of the third embodiment.

Hereinafter, the operation of a statistical delay simulation apparatus according to the third embodiment will be described with reference to FIG. 14.

First, the relationship between the delay average value μ and the delay standard deviation value σ is defined, in the library generation condition 103, by a function or the like. For example, as the library generation condition 103, an arbitrary function f indicating the relationship between the delay average μ and the delay standard deviation σ is defined as a proportional relationship including a proportional coefficient K, which is expressed as Equation 18. In this case, the proportional coefficient K can be provided as a proportional coefficient K file 121 in the library generation condition 103, as shown in FIG. 14. Moreover, the proportional coefficient K can be determined with reference to information for the statistical delay library 104 which has been generated in the past.

$$\sigma = f(\mu) = K\mu \qquad [\text{Equation 18}]$$

Figure 15:
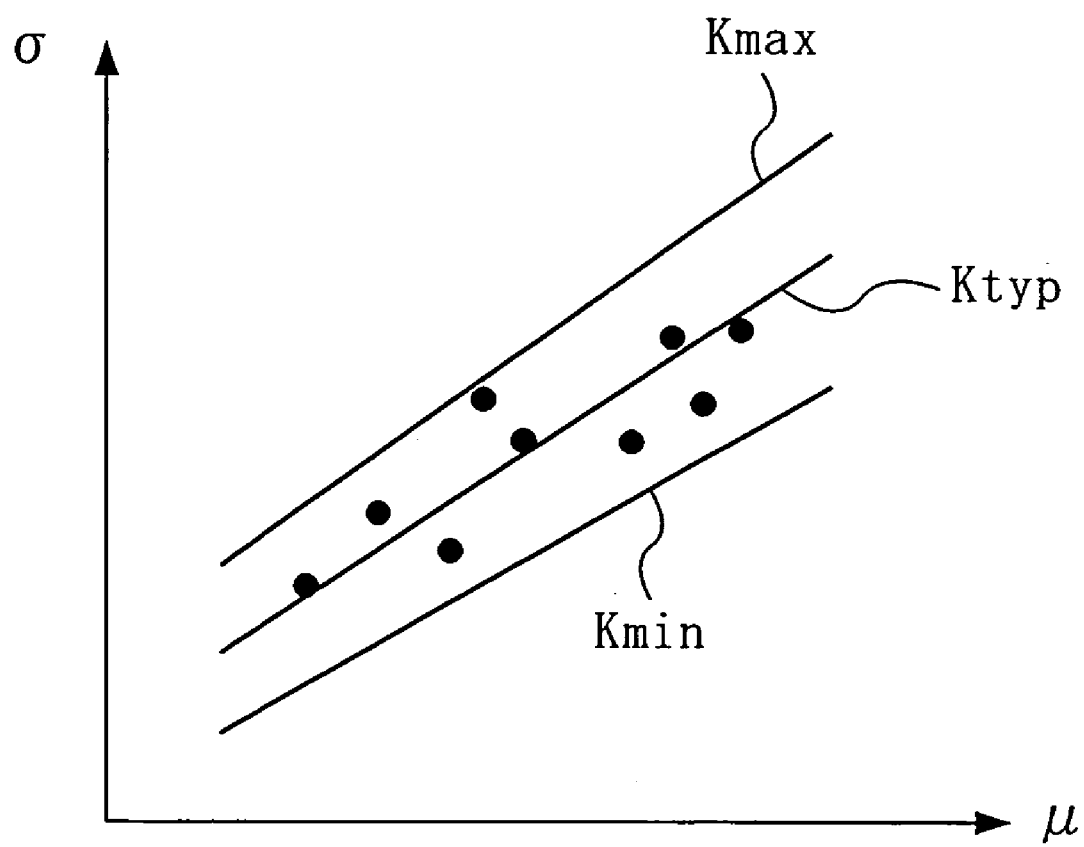
FIG. 15 is a graph showing the proportional relationship between a delay average and a delay standard deviation dealt with by the statistic LSI delay simulation apparatus of the third embodiment.

Moreover, as shown in FIG. 15, the relationship between the delay average value μ and the delay standard deviation value σ, in general, seems to be substantially proportional, although it depends on operation conditions of each circuit cell.

Next, as shown in FIG. 14, the statistical delay library generator 12B reads necessary information as well as the proportional coefficient K file 121 from the library generation condition 103. Then, an analysis control section 12g calculates the delay average value μ of each circuit cell in the same manner as in the first embodiment and then outputs calculation results to a delay average value μ file 12h. Subsequently, a σ-calculation section 12i calculates the delay standard deviation value σ from the obtained delay average value μ using Equation 18. The subsequent process steps are the same as those in the first embodiment.

According to the third embodiment, the delay standard deviation value σ is not necessarily obtained by circuit simulation, so that a simulation time can be largely reduced. Therefore, the statistical delay library 104 can be generated in a short time.

Note that in the third embodiment, only a coefficient is set for the proportional coefficient K. However, multiple coefficients may be used for the proportional coefficient K. For example, as shown in FIG. 15, upper and lower limits of the proportional relationship may be provided. In this case, for example, a proportional coefficient for a lower limit of a variation is set to be $K_{min}$, an average proportional coefficient is set to be $K_{typ}$, and a proportional coefficient for an upper limit is set to be $K_{max}$ in the library generation condition 103, and then a delay standard deviation can be obtained for each of the proportional coefficients $K_{min}$, $K_{typ}$, and $K_{max}$ based on Equations 19, 20 and 21, respectively. Thereafter, in the same manner as that in the first embodiment, process steps are performed using the lower limit delay standard deviation value $\sigma_{min}$, the average delay standard deviation value $\sigma_{typ}$, and the upper limit delay standard deviation value $\sigma_{max}$.

$$\sigma_{min}=K_{min}\mu \quad \text{[Equation 19]}$$

$$\sigma_{typ}=K_{typ}\mu \quad \text{[Equation 20]}$$

$$\sigma_{max}=K_{max}\mu \quad \text{[Equation 21]}$$

In this manner, according to the third embodiment, the same effects as those of the first embodiment can be obtained. Moreover, upper and lower limits of a variation range of the delay standard deviation value $\sigma$ according to operation conditions of each circuit cell can be determined. Therefore, if statistical delay simulation is performed to each of the delay standard deviations $\sigma_{min}$, $\sigma_{typ}$, and $\sigma_{max}$, upper and lower limits of a delay variation range for an LSI can be analyzed in a more simple manner.

(Fourth Embodiment)

Hereinafter, a fourth embodiment according to the present invention will be described with reference to the accompanying drawings.

Figure 16:
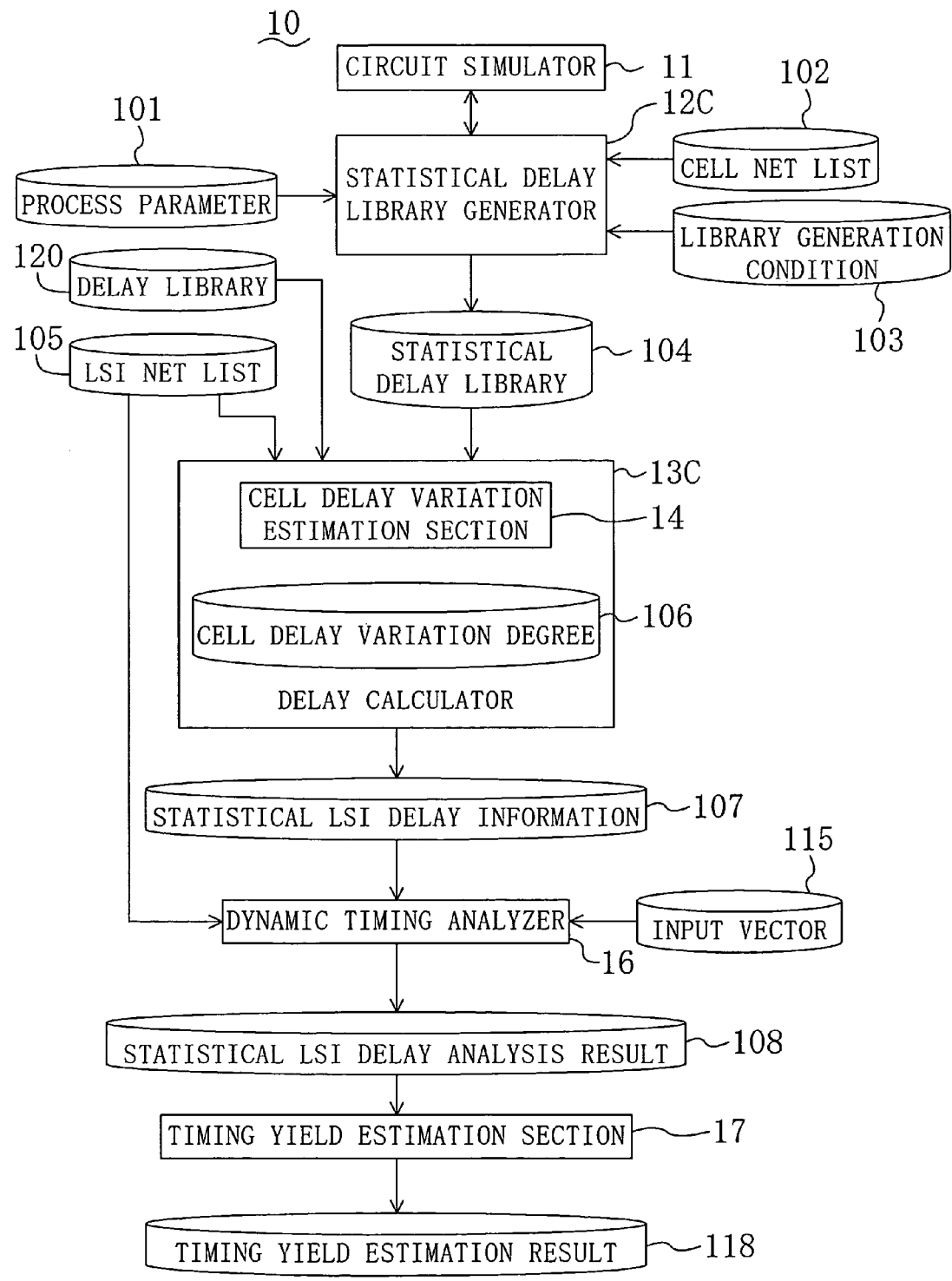
FIG. 16 is a block diagram illustrating a statistical delay library generator constituting a statistical LSI delay simulation apparatus according to a fourth embodiment of the present invention.

FIG. 16 is a block diagram illustrating the configuration of a statistical LSI delay simulation apparatus according to a fourth embodiment of the present invention. In FIG. 16, each member also shown in FIG. 1 is identified by the same reference numeral, and therefore description thereof will be omitted.

As shown in FIG. 16, a delay calculator 13C according to the fourth embodiment is formed so as to read the delay library 120. Moreover, instead of the static timing analyzer 15, a dynamic timing analyzer 16 is used. Furthermore, the fourth embodiment is different from the first embodiment also in that a timing yield estimation section 17 for generating a timing yield estimation result file 118 with reference to the statistical LSI delay analysis result file 108 is provided.

Even though a distribution of a delay variation of a circuit cell is assumed to be a normal distribution, a statistical delay library generator 12C according to the fourth embodiment obtains only a delay standard deviation value $\sigma$ by calculation and then outputs the obtained value to the statistical delay library 104. Accordingly, in this embodiment, the delay average value $\mu$ is not output to the statistical delay library 104.

The delay calculator 13C reads the LSI netlist 105, the statistical delay library 104 and the delay library 120. Then, for each circuit cell, each input and output combination, and each signal transition direction combination, a delay amount corresponding to the average value $\mu$ of a known normal distribution in which a delay variation is not taken into consideration is stored in the delay library 120 with output driving ability, input capacitance, logic information and the like, in the same manner as that for storing the statistical delay library 104. Accordingly, the delay calculator 13C reads the delay average value $\mu$, i.e., a delay variation of a circuit cell, from the delay library 120 generated by the known method and also reads the delay standard deviation $\sigma$ generated by the method of the fourth embodiment from the statistical delay library 104.

In this manner, the known, or, existing delay library 120 obtained in the case where a delay variation is not taken into consideration can be utilized. The subsequent operation is the same as that in the first embodiment.

A logic simulator called "Verilog", produced by Cadence Design Systems, Inc. (USA), for example, is a known dynamic timing analyzer which does not have the known statistical analysis function.

The dynamic timing analyzer 16 of the fourth embodiment shown in FIG. 16 is characterized by having, in addition to the function of a known dynamic timing analyzer, the function of performing statistical calculation under the assumption that a delay amount has a normal distribution.

More specifically, as shown in FIG. 16, the dynamic timing analyzer 16 first reads the LSI netlist 105, an input vector 115 and the statistical LSI delay information file 107. In this embodiment, a signal path to be analyzed is a circuit such as the circuit shown in FIG. 22. In this case, dynamic timing analysis is performed in the following manner. When a time series input signal group is given to an LSI which is an input vector, the operation state of the LSI circuit is changed momentarily and, accordingly, the signal path dynamically changes. For the dynamically changing signal path, the delay average $\mu_{path}$ of the signal path is calculated based on Equation 8 and also the delay standard deviation $\sigma_{path}$ of the signal path is calculated based on Equation 9 in the same manner as that of the static timing analyzer 15 described in the first embodiment.

In this manner, the LSI dynamic timing analysis in which a delay variation is taken into consideration is performed to all of signal paths and then the obtained results are output to the statistic LSI delay analysis result file 108.

(Timing Yield Estimation Process Step)

Hereinafter, the operation of the timing yield estimation section 17 that is a feature component of the fourth embodiment will be described with reference to the accompanying drawings.

Figure 17:
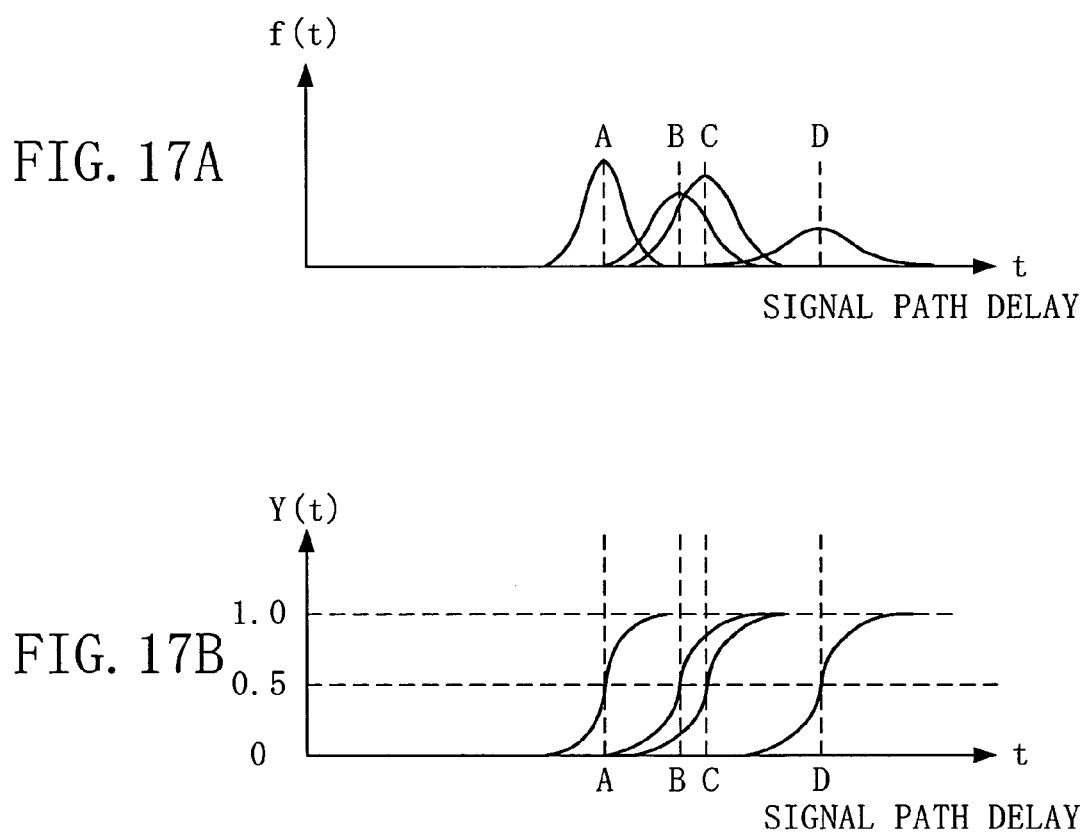
FIG. 17A is a graph showing an exemplary distribution of a signal path delay output by the statistical LSI delay simulation apparatus of the fourth embodiments.
FIG. 17B is a graph illustrating an example in which a timing yield is obtained based on FIG. 17A.

FIG. 17A illustrates an example of the results obtained from analysis of a delay variation for four signal paths A through D. In this case, the horizontal axis indicates time t which elapsed through each of the signal paths and the vertical axis indicates probability (normal distribution) f(t) expressed as Equation 5. Moreover, FIG. 17B illustrates an example of the results obtained from analysis of timing yields corresponding to the respective delay variations of the signal paths A through D. The horizontal axis indicates time t which elapsed through each of the signal paths and the vertical axis indicates timing yield Y(t) expressed as Equation 22. In this case, the range of Y(t) is 0 to 1.

$$Y(t)=\int_t N(\mu, \sigma^2)dt \quad \text{[Equation 22]}$$

The timing yield estimation section 17 reads the statistical LSI delay analysis result 108 in which, for example, the delay average value $\mu$ and standard deviation value $\sigma$ of each of the signal paths A through D are stored and then outputs to the timing yield estimation-result file 118.

The timing yield estimation section 17, based on Equation 20, integral is carried out for the cumulative probability distribution of each of the signal paths A through D from information which has been read, thereby calculating a timing yield Y(t) for the delay amount of each of the signal paths A through D.

Herein, the "timing yield" indicates the probability that a timing problem arises. If a value of 0.5 is given for the "timing yield", a problem concerning timing due to delays arises at a probability of 50%. Accordingly, for example, when a design target that a timing yield value in the signal path A is 0.9 is set, it is possible to determine from FIG. 17A how much delay amount is generated in the signal path A in this case. Note that in a known circuit designing, there is no concept of "timing yield", and if a timing problem arises due to delays, an operation probability in a signal pass is 0 whereas if no timing problem does not arise, the yield is 1.

In this manner, according to the fourth embodiment, the same effects as those of the first embodiment can be achieved. Moreover, it is possible to directly evaluate the delay amount and timing yield of each of the signal paths A through D with respect to a cycle time shown in Equation 1 by calculating the timing yield Y(t) from the probability distribution of each of the signal paths A through D.

Note that the timing yield estimation section 17 may be configured so as to use information for the statistical LSI delay analysis result file 108 output by the static timing analyzer 15 of the first embodiment.

(Modified Example of Fourth Embodiment)

Hereinafter, a modified example of the fourth embodiment of the present invention will be described with reference to the accompanying drawings.

Figure 18:
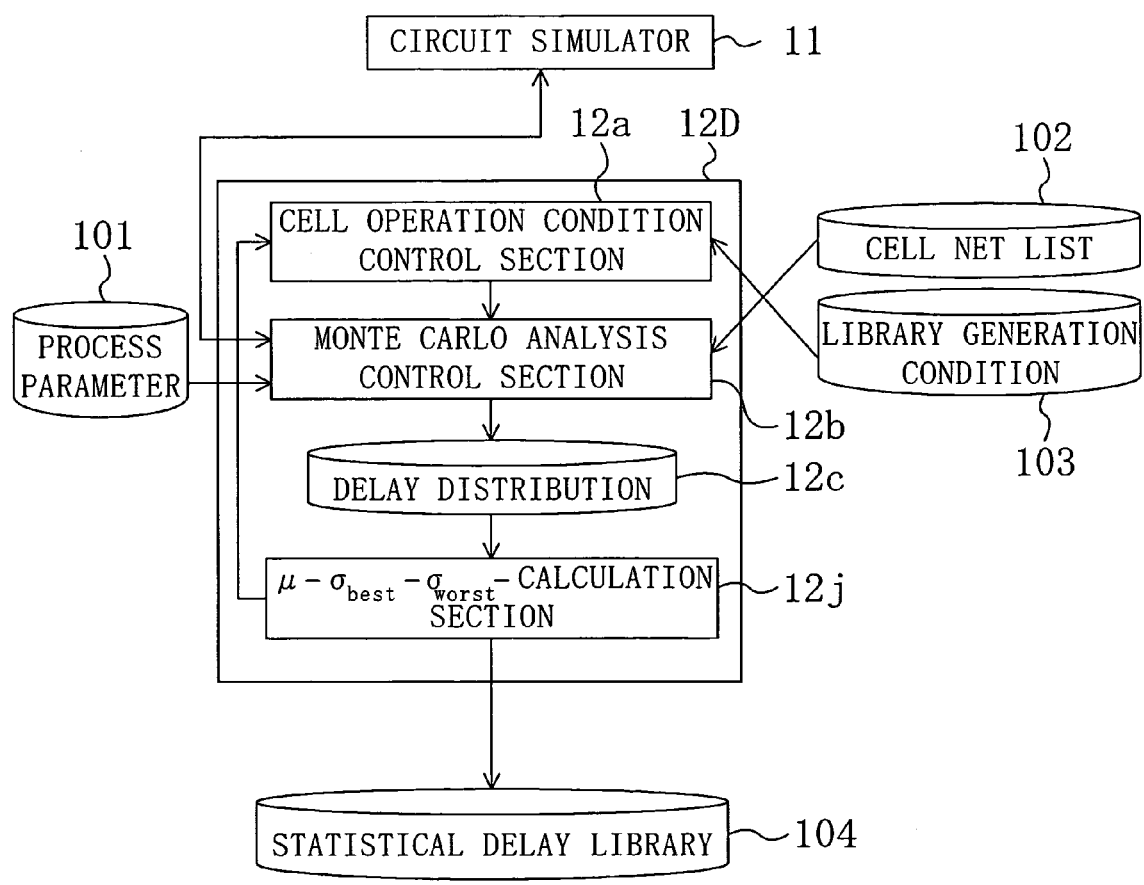
FIG. 18 is a block diagram illustrating a statistical delay library generator constituting a statistical LSI delay simulation apparatus according to a modified example of the fourth embodiment.

FIG. 18 is a block diagram of a statistical delay library generator constituting an statistical LSI delay simulation apparatus according to a modified example of the fourth embodiment of the present invention. In FIG. 18, each member also shown in FIG. 4 is identified by the same reference numeral, and therefore description thereof will be omitted.

A statistical delay library generator 12D shown in FIG. 18 divides delay variation distributions of circuit cells constituting an LSI into several ranges to deal with the distributions.

In this modified example, it is assumed that a delay variation of each circuit cell has a normal distribution. Furthermore, it is also assumed that a variation has an asymmetrical distribution including two ranges, i.e., a small side (best side) range in which margin components are smaller than an average value (typ) shown in FIG. 19 and a large side (worst side) range in which margin components are larger than the average value (typ).

Figure 20:
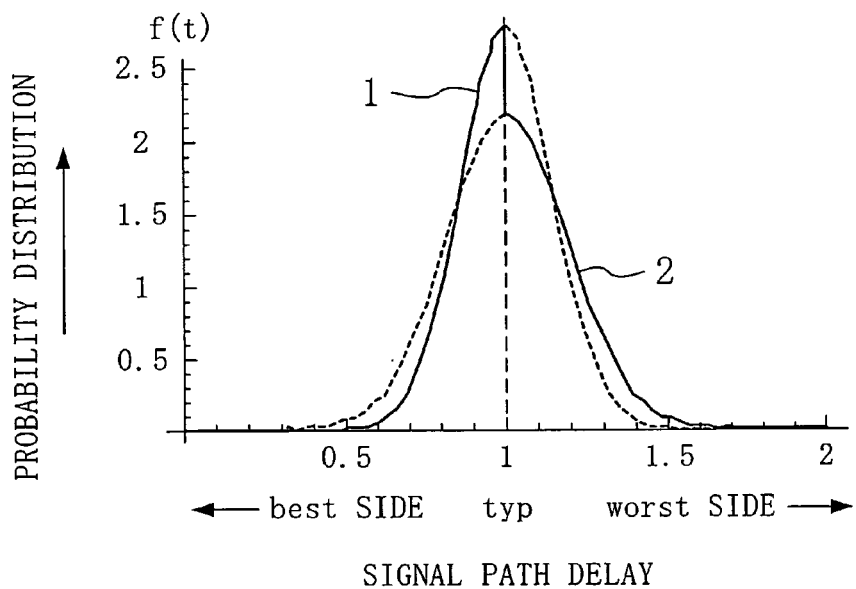
FIG. 20 is a graph virtually showing an asymmetrical delay variation dealt with by the statistical delay simulation apparatus of the modified example of the fourth embodiment.

More specifically, when a delay distribution is divided into the best side and worst side in this manner, as conceptually shown in FIG. 20, the delay distribution is assumed to has different delay standard deviations on the right and left sides of the typ value. However, it is actually difficult to directly calculate using a curve having such a virtual asymmetrical distribution. Thus, in this modified embodiment, two complete normal distributions 1 and 2 are used.

Therefore, as shown in FIG. 18, a $\mu$-$\sigma_{best}$-$\sigma_{worst}$-calculation section 12j constituting the statistical delay library generator 12D calculates a delay average value $\mu$ and delay standard deviation values $\sigma_{best}$ and $\sigma_{worst}$ under two conditions, i.e., a curve 1 including the best side and a curve 2 including the worst side, and then outputs calculation results to the statistical delay library 104.

Thereafter, the subsequent process steps to the process step of generating a timing yield estimation result file 118 are performed to obtain calculation results under each of the best side condition and the worst side condition in the same manner as in the fourth embodiment.

Figure 21:
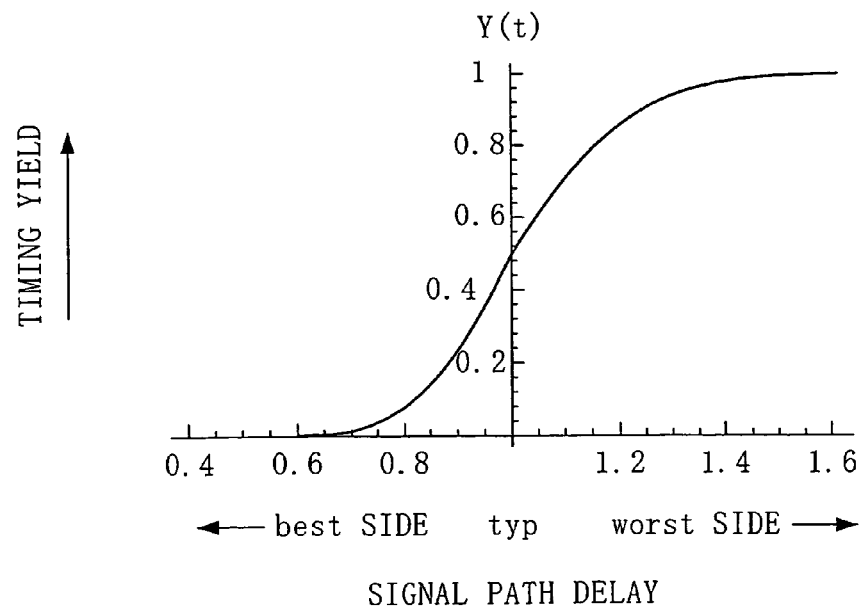
FIG. 21 is a graph showing an example in which a timing yield is obtained from the asymmetrical delay variation dealt with by the statistical delay simulation apparatus of the modified example of the fourth embodiment.

Next, timing yields (0–0.5) up to the typ value in the best side range and timing yields (0.5–1) up to the typ value in the worst side range are synthesized, thereby obtaining a curve for a timing yield shown in FIG. 21.

In this manner, in this modified example, the same effects as those of the fourth embodiment can be achieved. Moreover, even if a delay variation of a circuit cell to be analyzed is asymmetrical, the timing yield Y(t) can be obtained.

What is claimed is:

1. A statistical LSI delay simulation apparatus comprising:
    a circuit simulator for simulating a circuit operation of a circuit cell constituting an LSI;
    a statistical delay library generator for driving the circuit simulator and obtaining the dependency of a delay variation of each said circuit cell on respective operation conditions under a delay average value and a delay standard deviation value to generate a statistical delay library in which the dependency is described;
    a delay calculator for calculating a delay amount of each said circuit cell in the LSI by referring to the statistical delay library to generate a statistical LSI delay information file containing delay data for each said circuit cell; and
    a timing analyzer for simulating, based on the data contained in the statistical LSI delay information file, the operation containing delay variation of the LSI,
    wherein as the operation conditions, a rise time or fall time of input signal of each said circuit cell or output load capacitance of each said circuit cell are used.

2. The statistical LSI delay simulation apparatus of claim 1, wherein the delay variation of each said circuit cell is a variation in signal propagation delay between input and output terminals of the circuit cell.

3. The statistical LSI delay simulation apparatus of claim 1, wherein as the statistical property library, the dependency of a delay variation on the operation condition in each said circuit cell is expressed in a data table format.

4. The statistical LSI delay simulation apparatus of claim 1, wherein as the statistical property library, the dependency of a delay variation on an operation condition in each said circuit cell is expressed as a function.

5. The statistical LSI delay simulation apparatus of claim 1, wherein as the statistical property library, the delay variation in each said circuit cell is expressed as a normal distribution.

6. The statistical LSI delay simulation apparatus of claim 5, wherein as the statistical property library, the standard deviation of the normal distribution is indicated so as to be proportional to an average delay of each said circuit cell.

7. The statistical LSI delay simulation apparatus of claim 6, wherein as the statistical property library, the standard deviation of the normal distribution is expressed by a plurality of proportional relationships with a delay of each said circuit cell.

8. The statistical LSI delay simulation apparatus of claim 5, wherein as the statistical property library, the standard deviation of the normal distribution is obtained from a rise time or fall time of input signal and the output load capacitance of each said circuit cell.

9. The statistical LSI delay simulation apparatus of claim 5, wherein as the statistical property library, the standard deviation of the normal distribution is normalized with an average value of property.

10. The statistical LSI delay simulation apparatus of claim 1, wherein the delay calculator reads the statistical delay library, an LSI netlist in which connection information for each said circuit cell constituting the LSI is described, and the delay library, and
    the timing analyzer has not only the function as a dynamic timing analyzer for referring to the LSI netlist and an input vector but also the function of performing statistical calculation under the assumption that a delay amount has a normal distribution.

11. The statistical LSI delay simulation apparatus of claim 10, further comprising timing yield estimation means for estimating a timing yield from the delay variation of the LSI.

12. The statistical LSI delay simulation apparatus of claim 11, wherein in the statistical delay library generator, the range of the delay variation of the LSI is divided into at least two parts, a delay average value and delay standard deviation values are calculated to each said divided part, thereby outputting calculation results to the statistical delay library and in the timing yield estimation means, a timing yield is calculated for each said divided part from a result of the simulation, whereby a timing yield of the LSI is obtained with the timing yield of each said divided part taken into consideration.

13. The statistical LSI delay simulation apparatus of claim 1, wherein the statistical delay library generator generates the statistical delay library, based on a process parameter containing fabrication conditions, a cell netlist containing transistor level connection information, and a library generation condition containing a condition necessary for starting the circuit simulator.

14. The statistical LSI delay simulation apparatus of claim 13, wherein the statistical delay library generator includes a cell operation condition control section which operates based on the library generation condition, a Monte Carlo analysis control section which operates based on the cell netlist to generate a delay distribution file, and a calculation section for calculating the delay average value and the delay standard deviation value with reference to the delay distribution file.

15. The statistical LSI delay simulation apparatus of claim 13, wherein the statistical delay library generator includes a cell operation condition control section which operates based on the library generation condition, a sensitivity analysis control section which operates based on the cell netlist to output a sensitivity components obtained for each cell to a sensitivity result file, and a calculation section for calculating the delay average value and the delay standard deviation value with reference to the sensitivity result file.

16. The statistical LSI delay simulation apparatus of claim 1, wherein the delay calculator calculates reads the statistical delay library and an LSI netlist in which connection information for each said circuit cell constituting the LSI is described, and then calculates delays of circuit cells constituting the LSI.

17. The statistical LSI delay simulation apparatus of claim 16, wherein in the LSI netlist, parasitic element information such as the parasitic capacitance and parasitic resistance of an interconnect between circuit cells is described.

18. The statistical LSI delay simulation apparatus of claim 1, wherein the delay calculator includes a cell delay variation estimation section for estimating the degree of a variation in delay of each said circuit cell constituting the LSI to generate a delay variation degree file with reference to the statistical delay library.

19. The statistical LSI delay simulation apparatus of claim 1, wherein the timing analyzer has not only the function as a static timing analyzer for referring to an LSI netlist in which connection information for each said circuit cell constituting the LSI is described but also the function of statistically calculating delays under the assumption of a normal distribution.

* * * * *